US011718399B2

(12) United States Patent
Lee et al.

(10) Patent No.: US 11,718,399 B2
(45) Date of Patent: Aug. 8, 2023

(54) FLIGHT EQUIPMENT, AERIAL VEHICLE AND PROTECTIVE MEMBER

(71) Applicant: Rakuten Group, Inc., Tokyo (JP)

(72) Inventors: Kenichi Lee, Tokyo (JP); Takayoshi Inuma, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 337 days.

(21) Appl. No.: 16/753,067

(22) PCT Filed: Dec. 21, 2018

(86) PCT No.: PCT/JP2018/047364
§ 371 (c)(1),
(2) Date: Apr. 2, 2020

(87) PCT Pub. No.: WO2020/026468
PCT Pub. Date: Feb. 6, 2020

(65) Prior Publication Data
US 2020/0277054 A1   Sep. 3, 2020

(30) Foreign Application Priority Data

Aug. 3, 2018   (WO) .................. PCT/JP2018/029294

(51) Int. Cl.
*B64C 39/02*   (2023.01)
*B64C 27/08*   (2023.01)
(Continued)

(52) U.S. Cl.
CPC ............ *B64C 39/024* (2013.01); *B64C 27/08* (2013.01); *B64D 47/08* (2013.01); *B64U 10/13* (2023.01); *B64U 30/20* (2023.01); *B64U 2101/30* (2023.01)

(58) Field of Classification Search
CPC . B64C 27/08; B64C 39/024; B64C 2201/027; B64C 2201/108
See application file for complete search history.

(56) References Cited

U.S. PATENT DOCUMENTS

2017/0029101 A1   2/2017   Weissenberg
2017/0113800 A1   4/2017   Freeman
(Continued)

FOREIGN PATENT DOCUMENTS

CN   108248820 A   7/2018
DE   102005013391 A1   9/2006
(Continued)

OTHER PUBLICATIONS

Extended European Search Report issued dated Nov. 13, 2020 from the European Patent Office in Application No. EP18928503.4.
(Continued)

*Primary Examiner* — Christopher R Legendre
(74) *Attorney, Agent, or Firm* — Sughrue Mion, PLLC

(57) ABSTRACT

A protective member configured as a protective member that is mountable to an aerial vehicle having a body and at least one rotor held on the body, and includes a plurality of support members that are connectable to the aerial vehicle and have a flexible member stretched between distal end portions thereof so as to surround an outside of the body in planar view, wherein at least one of the plurality of support members has a tension adjusting mechanism that is capable of adjusting a tension applied to the flexible member in a stretching direction, by changing a distance from a center of the body to the distal end portion.

10 Claims, 15 Drawing Sheets

(51) Int. Cl.
  *B64U 10/13* (2023.01)
  *B64U 30/20* (2023.01)
  *B64D 47/08* (2006.01)
  *B64U 101/30* (2023.01)

(56) References Cited

U.S. PATENT DOCUMENTS

| | | |
|---|---|---|
| 2017/0152060 A1 | 6/2017 | Morisawa |
| 2017/0233072 A1 | 8/2017 | Chang |
| 2020/0039466 A1 | 2/2020 | Goto |
| 2020/0277054 A1* | 9/2020 | Lee .................. B64D 45/00 |

FOREIGN PATENT DOCUMENTS

| | | |
|---|---|---|
| JP | 6245566 B1 | 12/2017 |
| JP | 2018-030431 A | 3/2018 |
| JP | 2018-091684 A | 6/2018 |
| JP | 2018-112485 A | 7/2018 |
| KR | 10-2017-0129518 A | 11/2017 |
| KR | 10-1796478 B1 | 11/2017 |
| KR | 10-1808073 B1 | 12/2017 |
| WO | 2015/178091 A1 | 11/2015 |
| WO | 2016/027942 A1 | 2/2016 |
| WO | 2017/018813 A1 | 2/2017 |
| WO | 2017143365 A1 | 8/2017 |
| WO | 2018/084125 A1 | 5/2018 |

OTHER PUBLICATIONS

Notice of Reasons for Rejection issued to JP Application No. 2018-239939, dated Oct. 29, 2019.
Notice of Decision to Grant a Patent issued to JP Application No. 2018-559906, dated Dec. 18, 2018.
International Search Report for PCT/JP2018/047364 dated Feb. 12, 2019 [PCT/ISA/210].

* cited by examiner

FLIGHT EQUIPMENT, AERIAL VEHICLE AND PROTECTIVE MEMBER

CROSS REFERENCE TO RELATED APPLICATIONS

This application is a National Stage of International Application No. PCT/JP2018/047364 filed Dec. 21, 2018, claiming priority based on International Application No. PCT/JP2018/029294 filed Aug. 3, 2018.

TECHNICAL FIELD

The present invention relates to flight equipment, an aerial vehicle and a protective member for such an aerial vehicle.

BACKGROUND ART

Aerial vehicles such as drones have been conventionally known which freely move in midair with the help of lift generated by rotation of rotors thereof. The rotor of an aerial vehicle of this type can be damaged by contact that may be caused when the aerial vehicle collides with a tree, or a building due to maneuvering by the user or influence of wind, or when the aerial vehicle makes an emergency landing on the ground. Since such damage to the rotor may hinder flight, a technique to equip an aerial vehicle with a protective member for preventing the rotor from being damaged or distorted by an external impact has been proposed (see, for example, Patent Document 1).
Patent Document 1: Japanese Patent No. 6245566

SUMMARY OF INVENTION

Technical Problem

However, known techniques including the technique disclosed in Patent Document 1 assign importance to only the protection of the rotors, and have room for improvement from the viewpoints of mountability of the protective member to an aerial vehicle and portability of flight equipment including the protective member.

One or more embodiments of the present invention has been achieved in view of the foregoing background, and is intend to achieve an object of providing a protective member, an aerial vehicle and flight equipment that are easy to carry, while ensuring enhanced mountability to the aerial vehicle.

Solution to Problem

To achieve the above object, flight equipment according to an aspect of the present invention includes: an aerial vehicle having a body and at least one rotor held on the body; and a protective member having a plurality of support members that are connected to the aerial vehicle and have a flexible member stretched between distal end portions thereof so as to surround an outside of the body, wherein the aerial vehicle or the protective member has a tension adjusting mechanism that is capable of adjusting a tension applied to the flexible member in a stretching direction, by changing a distance from a center of the body to the distal end portion of at least one of the plurality of support members.

Another aspect of the present invention is directed to an aerial vehicle including: a body; and at least one rotor held on the body, wherein the aerial vehicle is adapted to be mounted with a plurality of support members that have a flexible member stretched between distal end portions thereof so as to surround an outside of the body, and the aerial vehicle further includes a tension adjusting mechanism that is capable of adjusting a tension applied to the flexible member in a stretching direction, by changing a distance from a center of the body to the distal end portion of at least one of the plurality of support members.

Yet another aspect of the present invention is directed to a protective member mountable to an aerial vehicle having a body and at least one rotor held on the body, the protective member including: a plurality of support members that are connectable to the aerial vehicle and have a flexible member stretched between distal end portions thereof so as to surround an outside of the body, wherein at least one of the plurality of support members has a tension adjusting mechanism that is capable of adjusting a tension applied to the flexible member in a stretching direction, by changing a distance from a center of the body to the distal end portion.

Advantageous Effects of Invention

The present invention provides flight equipment, an aerial vehicle and a protective member that are easy to carry, while ensuring enhanced mountability.

DESCRIPTION OF EMBODIMENTS

Embodiments of the present invention will be described below with reference to the drawings. In the following description, unless otherwise noted, the plane on which a drone as an aerial vehicle lands is referred to as the "landing plane", and in particular, a direction in which the drone takes off as viewed from the landing plane is referred to as the "upward direction", while the direction opposite to the "upward direction" is referred to as the "downward direction". In addition, a distance from the landing plane in the upper direction is referred to as "height", and the "vertical direction" is defined to coincide with the upward/downward direction.

Figure 1:
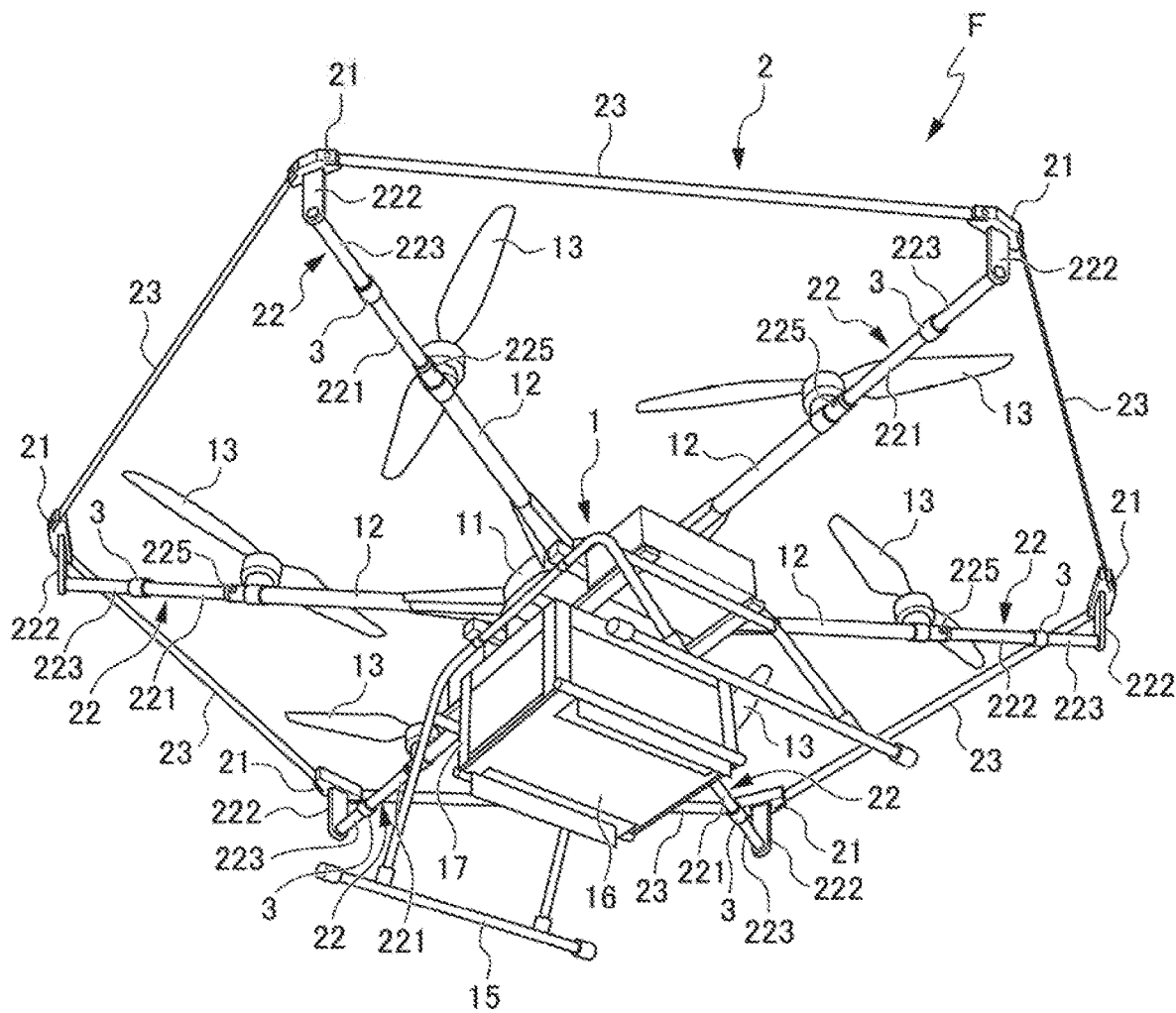
FIG. 1 is a perspective view showing an exemplary configuration of a protective member and flight equipment according to an embodiment of the present invention.
Figure 2:
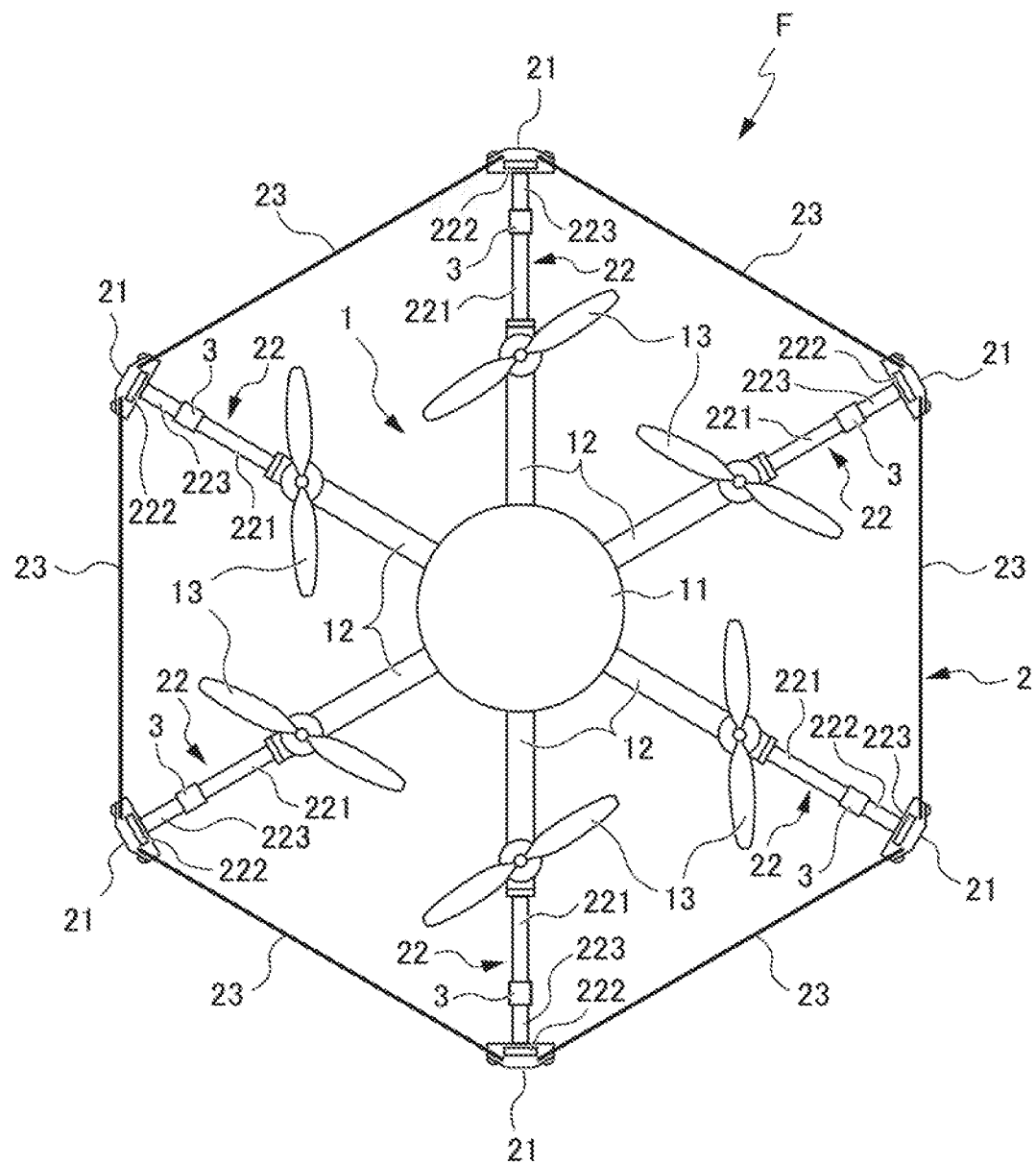
FIG. 2 is a schematic planar view showing the flight equipment of FIG. 1.

FIG. 1 is a perspective view showing an exemplary configuration of a protective member and flight equipment according to an embodiment of the present invention. FIG. 2 is a schematic planar view showing the flight equipment F of FIG. 1. Note that FIG. 2 shows the flight equipment F schematically as compared with FIG. 1, while omitting part of the configuration of the flight equipment F.

As shown in FIGS. 1 and 2, the flight equipment F includes a drone (aerial vehicle) 1 and a drone guard (protective member) 2 mounted to the drone 1.

The drone 1 includes a body 11, arms 12, and a plurality of rotors 13.

The body 11 incorporates an electronic device (not shown) for executing various kinds of control processing required for flight and other operations of the drone 1. For example, the electronic device is a computer that controls a motor for driving the rotors 13, transmits and receives signals to and from external devices such as a controller operated by an operator of the drone 1 (hereinafter may be referred to also as the "user"), and performs processing based on information from various sensors such as a camera (not shown) provided on the body 11.

The lower surface of the body 11 is provided with, for example, legs 15 that come into contact with the landing plane and a holder frame 17 that holds a box 16 for accommodating a delivery target.

Each arm 12 is formed in a rod shape extending in a horizontal direction. One of the end portions of the arm 12 is connected to the body 11, and the other (hereinafter, referred to as the distal end portion) is provided with the rotor 13. In the present embodiment, the six (plurality of) arms 12 extend radially and symmetrically from the body 11 in planar view. The six arms 12 are equally spaced apart from each other in a circumferential direction.

The rotors 13 are held by the body 11 via the arms 12. Specifically, each rotor 13 is rotatably provided on an upper surface of the distal end portion of an associated one of the arms 12. The rotors 13 are mounted to the arms 12 such that their planes of revolution coincide with a horizontal plane. In the present embodiment, each of the six arms 12 is provided with the rotor 13. The six rotors 13 in total of the drone 1 rotate to generate lift for the drone 1 to fly.

The drone guard 2 prevents the rotors 13 and the other components from colliding directly with buildings and trees during flight of the flight equipment F, and thereby protects the drone 1 from external impacts. The drone guard 2 is per se a protective member according to an embodiment of the present invention.

The drone guard 2 includes: a plurality of support members 22 connectable to the drone 1; guard parts (flexible members) 23 that are stretched between distal end portions of the plurality of support members 22 so as to surround at least the body 11 in planar view; and mounting parts 21 attached to the distal end portions of the support members 22 and holding the guard parts 23.

It is preferable that the guard parts 23 be provided to surround an area from the body 11 to an outside of the arms 12. As schematically shown in FIG. 2, it is farther preferable that the guard parts 23 be provided to surround an area from the body 11 to an outside of the rotors 13. Here, the term "outside" means a side away from the body 11 when the center of gravity or center of the body 11 of the drone 1 is defined as the base point. The "outside" can also be expressed as radially outside while the base point is set to be the center of a sphere.

In the present embodiment, the six support members 22 are connected to the distal end portions of the six arms 12, and the guard parts 23 are each stretched between the distal end portions of the six support members 22 in total. Each support member 22 has a tension adjusting mechanism 3 that can adjust a tension applied to the guard parts 23 in a stretching direction, by changing a distance from the center of the body 11 to the distal end portion of the support member 22. Specifically, each support member 22 has: an arm connecting part (fastenable part) 221 that is formed in a rod shape extending substantially perpendicularly to the rotation axis of the rotor 13 and is configured to be fastened to the drone 1; a guard connecting part (extension part) 222 whose distal end is mounted with the mounting part 21; and a movable part 223 whose portion adjacent to a proximal end overlaps with, and is held on the arm connecting part 221, the movable part 223 extending further outward from the arm connecting part 221 and having a distal end connected to the guard connecting part 222. Note that "substantially perpendicular(ly)" as used herein should be interpreted to mean that a relative angle is 85° or larger and 95° or smaller, and "substantially parallel" should be interpreted to mean that a relative angle is 5° or smaller.

As shown in FIG. 2, the guard parts 23 are stretched between the mounting parts 21 to connect the mounting parts 21 to each other, the mounting parts 21 being attached to the guard connecting parts 222 located at the outer ends of the six support members 22. That is, in planar view, the six (plurality of) guard parts 23 form a hexagon (polygon), and all of the plurality of rotors 13 are located inside the hexagon. In the following description, the direction along the longitudinal direction of the guard parts 23, that is, the direction along the circumferential direction of the entire drone guard 2 will be defined as the "stretching direction".

Figure 3:
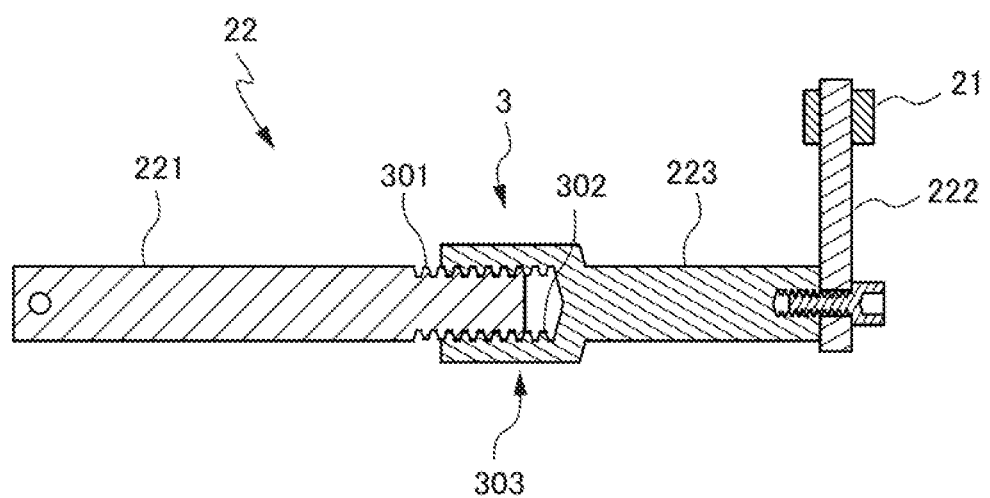
FIG. 3 is a schematic cross-sectional view showing a support member of the flight equipment of FIG. 1.

Each tension adjusting mechanism 3 is configured to adjust the overlap length between the guard connecting part 223 and the arm connecting part 221, the guard connecting part 223 holding, on a distal end side thereof, the guard parts 23 via the guard connecting part 222 and the mounting part 21. Specifically, as shown in FIG. 3, the tension adjusting mechanism 3 has an outer thread 301 that is formed on a distal end portion of the arm connecting part 221, and a socket portion 303 that is provided in a proximal end portion of the movable part 223 and has an inner thread 302 engageable with the outer thread 301. With the tension adjusting mechanism 3, a length in which the inner thread 302 of the socket portion 303 engages with the outer thread 301 can be adjusted, whereby the distance from the center of the body 11 to the distal end portion of the support member 22 (guard connecting part 222), and thus, to the mounting part 21 held there can be changed. Thus, the tension adjusting mechanism 3 can adjust the distance between adjacent ones of the mounting parts 21, and consequently, can adjust a tension applied to the associated guard parts 23 in the stretching direction. In particular, moving the distal end portion of the support member 22 (the guard connecting part 222) on a straight line passing through the center of the body 11 makes it possible to evenly adjust the tension applied to the guard parts 23 disposed on both sides of the guard connecting part 222 with efficiency. In addition, since the distal end portion of the support member 22 moves in a plane perpendicular to the rotation axis of the rotor 13, the guard parts 23 remain at the same height when the tension is adjusted by the tension adjusting mechanism 3. Thus, the guard parts 23 are held at a height close to the rotors 13, thereby protecting the rotors 23 easily and reliably.

When the flight equipment F flies, a tension is applied to the guard parts 23. As a reaction to the application of the tension, a force is generated which presses the inner thread 302 against the outer thread 301 in the axial direction. Consequently, the movable part 223 is impeded from rotating with respect to the arm connecting part 221, resulting in that a force acts to fasten the movable part 223 to the arm connecting part 221. Note that the tension adjusting mechanism 3 may have a separate structure for fastening the movable part 223 to the arm connecting part 221. Examples of the separate structure include a lock nut that is engaged with the outer thread 301 to abut against the end surface of the socket portion 303.

Each arm connecting part 221 of the present embodiment has, in a portion adjacent to the proximal end thereof, a rotation mechanism 225, and is rotatable with respect to the distal end portion of the associated arm 12. Therefore, the drone 1 can be carried while being in a state where the support members 22 are folded. To use the drone 1, as shown in FIG. 1, the drone 1 is brought into a state where the arm connecting parts 221 of the support members 22 extend straight and coaxially with the arms 12 (hereinafter, this state is referred to as the use state of the support members 22).

The movable part 223 that is provided between the arm connecting part 221 and the guard connecting part 222 is a member via which the distance between the arm connecting part 221 and the guard connecting part 222 can be adjusted.

The guard connecting parts 222 are parts connected to the drone guard 2. Each guard connecting part 222 is connected to an end portion (hereinafter, referred to as the outer end portion) of the associated arm connecting part 221, the end portion being opposite to the inner end portion. In the use state of the support members 22, the longitudinal direction of the guard connecting parts 222 is directed upward. Thus, since the support members 22 have the guard connecting parts 222 extending substantially parallel to the rotation axes of the rotors 13, the height of the drone guard 2 can be easily adjusted. As a result, the guard parts 23 can be supported while being prevented from contacting with the rotors 13.

The guard parts 23 prevent a principal portion of the drone 1 from colliding with buildings and trees. The guard parts 23 are preferably arranged to surround the rotors 13 to prevent the rotors 13 from colliding directly with buildings and trees.

The guard part 23 may be constituted by a rope-like or wire-like flexible material. It is however preferable that the guard part 23 be constituted by an elongated band-shaped member made of a flexible and elastic material, examples of which include carbon fiber composite materials such as carbon fiber reinforced plastics (CFRP). In other words, it is desirable that the guard part 23 be produced by molding a material having a certain elastic modulus into a band shape having a small thickness, and thereby configured as a member that has a flexibility allowing bending deformation in the thickness direction while having a sufficient stiffness in the width direction. The term "band shape" as used herein means a shape having an average width that is five times or more as large as an average thickness. Note that the average width and the average thickness shall be calculated without taking account of a structure for connection to the guard connecting parts 222 and a structure that may be provided between the guard connecting parts 222 for a different purpose (not included in the present embodiment).

The guard parts 23 are preferably supported such that the thickness direction thereof is substantially perpendicular to the rotation axes of the rotors 13. Thus, when the flight equipment F collides with another object in the radial direction of the rotor 13, the guard part 23 can cushion the impact by contacting with the other object at a plane thereof, thereby making it possible to reduce damage to the other object.

Further, the guard parts 23, which are arranged such that the thickness direction thereof is substantially perpendicular to the rotation axes of the rotors 13, resist flexure in a direction (vertical direction) parallel to the rotation axes of the rotors 13. That is, in the guard part 23, a flexural vibration (vertical shaking) in a direction parallel to the rotation axis of the rotor 13 is less likely to occur than a flexural vibration (horizontal shaking) in a direction (horizontal direction) perpendicular to the rotation axis of the rotor 13. As a result, even if a flexural vibration occurs in the guard part 23 that is held so as not to overlap with the rotor 13 as viewed in the radial direction, since a component in the direction of the rotation axis of the rotor 13 is small, the guard part 23 is less likely to contact with the rotor 13.

Therefore, the guard parts 23 can be arranged close to the rotors 13 as viewed in the radial direction of the rotation axes of the rotors 13, thereby enabling the drone guard 2 to protect the rotors 13 more reliably. Further, an arrangement is conceivable in which, for example, the guard parts 23 are each arranged in a gap between the rotor 13 and the arm 12 in order to protect only the body 11, that is, the guard parts 23 are arranged to overlap with the rotors 13 in planar view. Also with this arrangement, the guard parts 23 can be prevented from contacting with the rotors 13. This effect of preventing contact between the guard parts 23 and the rotors 13 is particularly advantageous when the guard parts 23 become relaxed with a decrease in the tension due to aging or sortie abnormality.

Arranging the guard parts 23 close to the rotors 13 as viewed in the radial direction of the rotation axes of the rotors 13 makes it possible to reduce the height and the horizontal projection area of the entire flight equipment F, while preventing the contact between the guard parts 23 and the rotors 13. This contributes to improvement of mobility of the flight equipment F and reduction of air resistance of the flight equipment F.

The configuration in which the guard parts 23, which resist the flexural vibration in a direction parallel to the rotation axes of the rotors 13 (i.e., the vertical shaking), are supported on the guard connecting parts 222 extending substantially parallel to the rotation axes of the rotors 13 makes it less likely for the guard parts 23 to be displaced due to the vibration. Consequently, the risk of the contact between the guard parts 23 and the rotors 13 that can be caused by such displacement of the guard parts 23 can also be reduced.

The drone guard 2 can be in two states, namely, a use state shown in FIG. 1 in which the drone guard 2 is in use to protect the rotors 13 when the drone 1 flies; and a non-use state (not shown) in which the drone guard 2 is not used while the drone 1 is being carried by a user or is in storage. Next, a method for mounting the drone guard 2 to the drone 1 will be described.

First, in order to bring the drone guard 2 into the use state, a user or any other person brings the support members 22 into the use state such that the longitudinal direction of each arm connecting part 221 coincides with the horizontal direction, as shown in FIG. 1. While maintaining this state as it is, the user fastens the mounting parts 21 to the guard connecting parts 222 of the support members 22. At this time, the tension adjusting mechanisms 3 are each in a state where the outer screw 301 is deeply engaged with a nut 226, so that the distal end portions of the support members 22 come close to the center of the body 11. As a result, the distance between the guard connecting parts 222 is slightly reduced. Thus, the user can attach the mounting parts 21 to the guard connecting parts 222 while the guard parts 23 are relaxed. Thereafter, by means of the tension adjusting mechanisms 3, the user moves the distal end portions of the support members 22 away from the center of the body 11 so as to increase the distance between the mounting parts 21, thereby applying a tension to the guard parts 23.

The application of the tension to the guard parts 23 by the tension adjusting mechanisms 3 results in application of an internal stress to the guard parts 23, the internal stress acting in a tensile direction. The application of the internal stress to the guard parts 23 in this manner makes the influence of an external force relatively small, thereby making it less likely for the guard parts 23 to experience further deformation, i.e., a vibration.

The flexural vibration of the guard parts 23 can be considered as a vibration of a string. Application of a tension to the guard part 23 increases a speed of sound (propagation speed of vibration) in the guard part 23, and consequently, increases the natural frequency of the guard part 23. Since the vibration of the guard part 23 is mainly caused by a wind generated by the rotation of the rotor 13, the vibration has a relatively large number of low-frequency components. In addition, the primary mode vibration frequency that can cause the guard part 23 to vibrate relatively widely is a particularly low frequency. Thus, increasing the natural frequency by the application of a tension to the guard part 23 enables efficient reduction of the flexural vibration of the guard part 23.

The user adjusts the tension adjusting mechanisms 3 of the six support members 22 so that an appropriate tension is applied to each of the six guard parts 23. Thus, the work of mounting the drone guard 2 to the drone 1 is completed. As described earlier, when the drone guard 2 of the present embodiment is in the use state, the guard parts 23 are stretched radially symmetrically in a hexagonal shape around the drone 1.

The guard parts 23 are preferably arranged to be held at a height where the guard parts 23 do not overlap with the rotors 13 as viewed in the radial direction of the rotation axes of the rotors 13. As a result, the guard parts 23 are prevented from contacting with the rotors 13 even when a horizontal flexural vibration occurs in the guard parts 23. In the case where the rotors 13 are held to be positioned above the body 11 as in the present embodiment, it is more preferable to hold the drone guard 2 at a position higher than the rotors 13. With this configuration, when the flight equipment F descends, the legs 15 arranged below the body 11 and the rotors 13 can prevent damage to the body 11 and the rotors 13. When the flight equipment F ascends, the drone guard 2 arranged at a position as high as, or higher than the rotors 13 can effectively prevent damage to the body 11 and the rotors 13.

Figure 4:
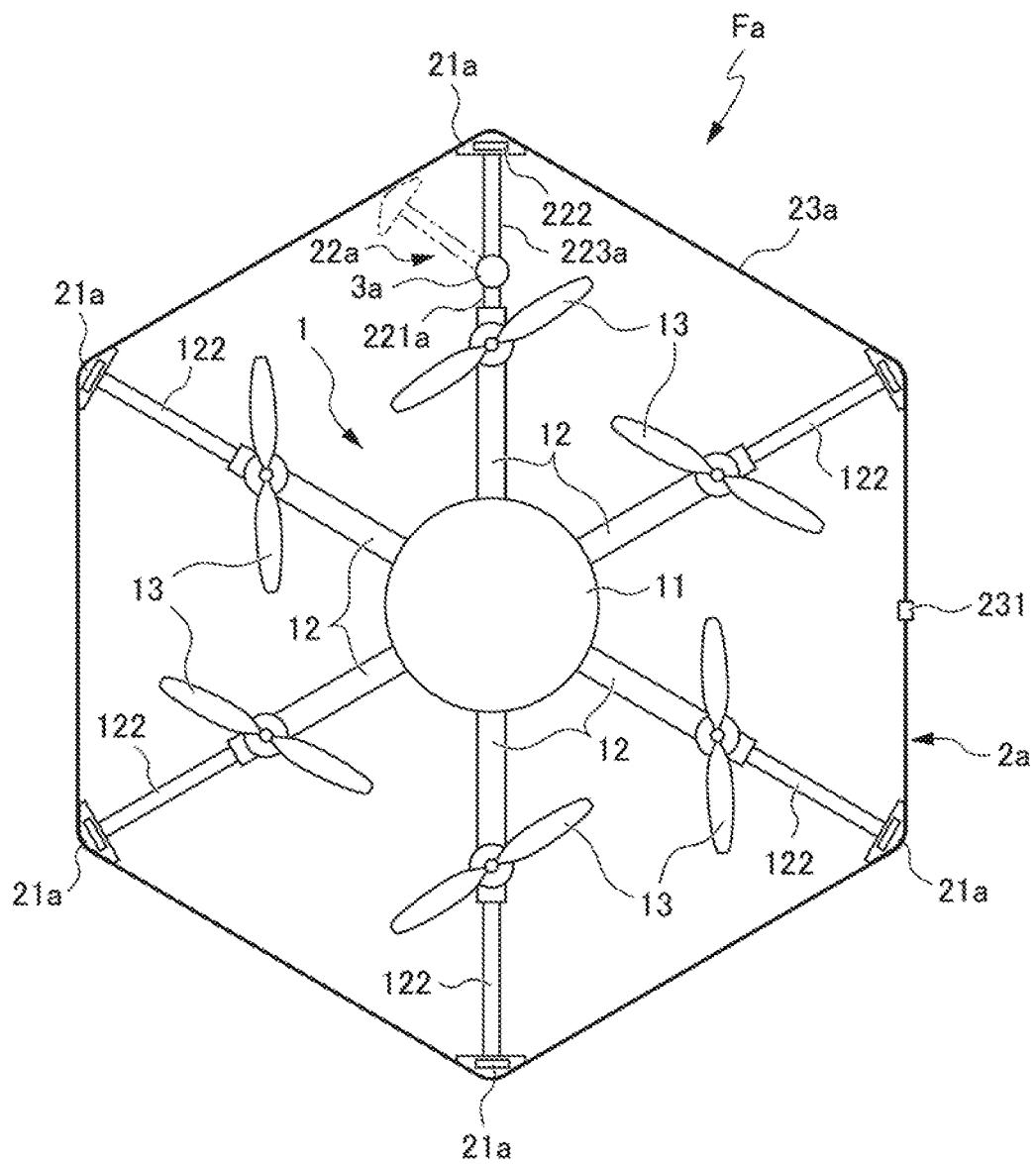
FIG. 4 is a schematic planar view showing an exemplary configuration of a protective member and flight equipment according to an embodiment different from that shown in FIG. 1.

FIG. 4 is a schematic planar view showing an exemplary configuration of a drone guard 2a as a protective member and flight equipment Fa according to an embodiment different from that shown in FIG. 1. In the following description, the components common to or similar to those of the embodiment described above are denoted by the same reference characters, and the detailed description thereof may be omitted.

The flight equipment Fa includes a drone (aerial vehicle) 1 and a drone guard (protective member) 2a mounted to the drone 1. The drone guard 2a is per se a protective member according to an embodiment of the present invention.

The drone guard 2a includes: a plurality of support members 22a connectable to the drone 1; a guard part (flexible member) 23a that is stretched between distal end portions of the plurality of support members 22a and 122 (one support member 22a and five support members 122), so as to surround at least a body 11 in planar view; and mounting parts 21a attached to the distal end portions of the support members 22a and holding the guard part 23a.

In the drone guard 2a of the present embodiment, the guard part 23a formed in a single endless loop is supported by the six support members 22a and 122. Further, in the drone guard 2a of the present embodiment, only the single support member 22a has a tension adjusting mechanism 3a, whereas the other support members 122 have no means for changing a distance from the center of the body 11 to the distal end portions thereof.

The guard part 23a may be constituted by a material formed into a seamless loop shape, or by a member with a certain length formed into a loop shape by having its both ends connected together with a joint 231, as shown in the figure.

Figure 5:
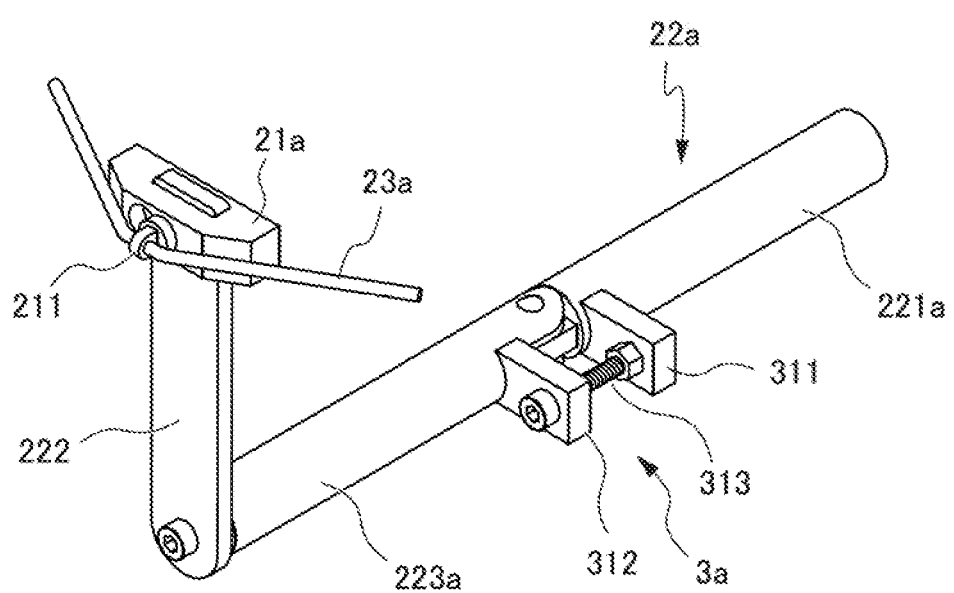
FIG. 5 is a perspective view showing a support member of the flight equipment of FIG. 4.

The mounting parts 21a are configured to support the guard part 23a such that the guard part 23a is movable in a length direction thereof. As a specific example, as shown in FIG. 5, each mounting part 21a can be configured to have, for example, a holder ring 211 which is disposed outside with respect to the support member 22, and through which the guard part 23a passes.

In the present embodiment, the support member 22a provided with the tension adjusting mechanism 3a has: an arm connecting part (fastening part) 221a that is formed in a rod shape extending substantially perpendicularly to the rotation axis of a rotor 13; a movable part 223a pivotably connected to a distal end portion of the arm connecting part 221a (in FIG. 4, the two-dot chain lines indicate the movable part 223a in a pivoted state); and a guard connecting part (extension part) 222 that extends substantially parallel to the rotation axis of the rotor 13 from a distal end portion of the movable part 223a and has a distal end portion mounted with the mounting part 21.

The tension adjusting mechanism 3a is configured to adjust an angle formed by the movable part 223a with the arm connecting part 221a, the movable part 223a holding, on a distal end side thereof, the guard part 23a via the guard connecting part 222 and the mounting part 21a. Thus, by pivoting the movable part 223a, the distal end portion of the support member 22a can be relatively easily moved by a large amount. With this configuration, the guard part 23a can receive a sufficient tension applied thereto in a use state, and can be sufficiently relaxed in a non-use state.

The tension adjusting mechanism 3a may pivot the movable part 223 (for example, in the vertical direction around a horizontal axis) so as to move the distal end portion of the support member 22a in an optional direction. It is preferable, however, that the tension adjusting mechanism 3a be configured to pivot the movable part 223a so as to move the distal end portion of the support member 22a in a plane perpendicular to the rotation axis of the rotor 13, i.e., to pivot the movable part 223a about an axis parallel to the rotation axis of the rotor 13. Pivoting the movable part 223a around the axis parallel to the rotation axis of the rotor 13 does not cause the motion of the tension adjusting mechanism 3a to change the height of the guard part 23a, thereby enabling the support member 22a to be easily brought into the use state.

A specific configuration of the tension adjusting mechanism 3a may be chosen as appropriate. For example, as shown in FIG. 5, the tension adjusting mechanism 3a can be configured to have: a fastened side lever 311 that projects in the horizontal direction from a side surface of a vicinity of the distal end of the arm connecting part 221a; a movable side lever 312 that projects along the fastened side lever 311 from a side surface of a vicinity of the proximal end of the movable part 223a; and an adjusting screw 313 that fixes a distance between the distal end of the fastened side lever 311 and the distal end of the movable side lever 312. The tension adjusting mechanism 3a may have an optional configuration, such as a lock nut for fastening the adjusting screw 313, which can fix an angle formed by the movable part 223a with the arm connecting part 221a in a state where a suitable tension is applied to the guard part 23a.

The present embodiment also allows the user or any other person to easily attach and detach the drone guard 2 by relaxing the guard part 23a by means of the tension adjusting mechanism 3a, and to properly protect the drone 1 in the use state by causing the tension adjusting mechanism 3a to apply a tension to the guard part 23a.

Figure 6:
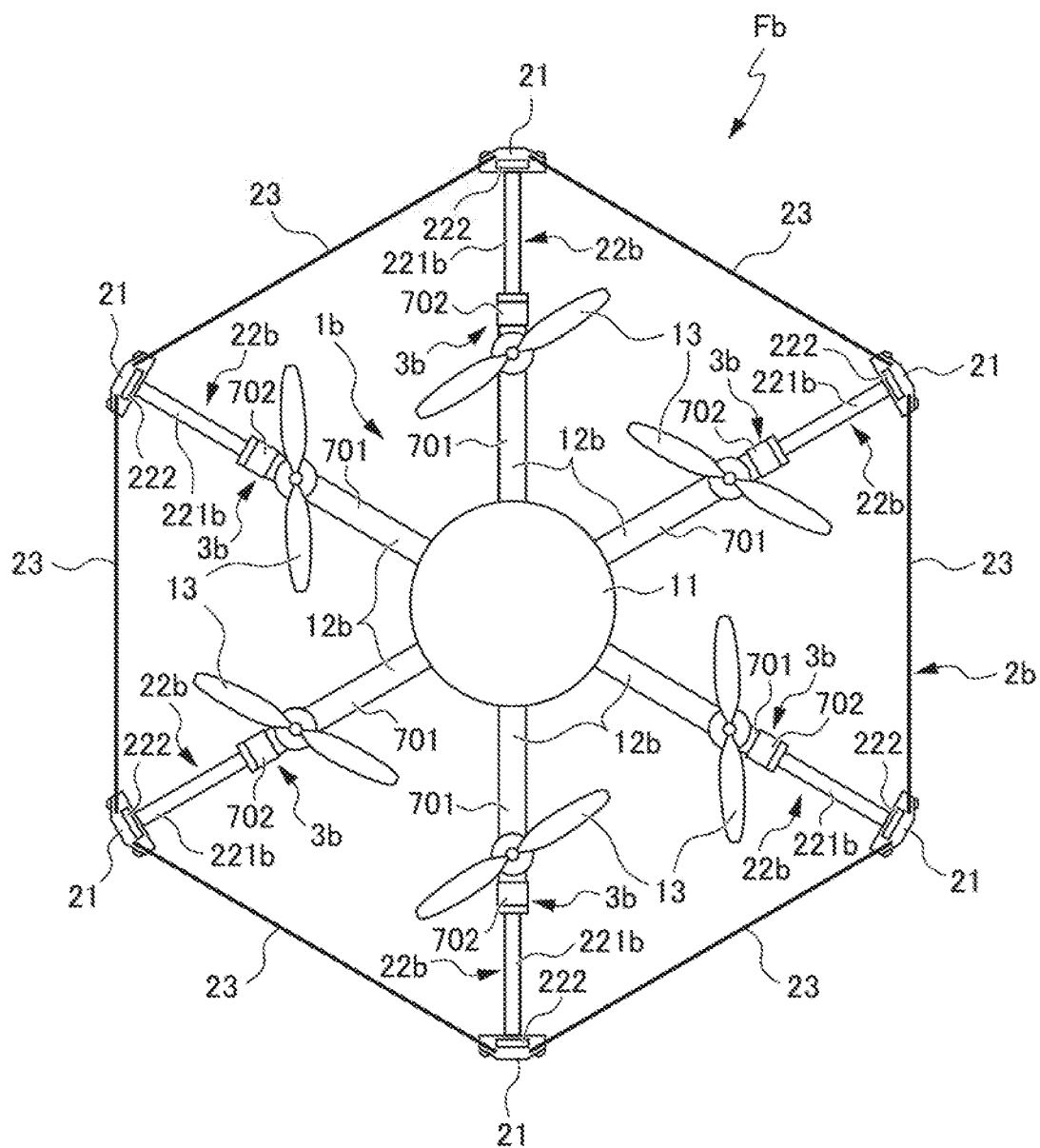
FIG. 6 is a schematic planar view showing an exemplary configuration of a protective member and flight equipment according to an embodiment different from those shown in FIGS. 1 and 4.

FIG. 6 is a schematic planar view showing an exemplary configuration of a drone guard 2b as a protective member and flight equipment according to an embodiment different from those shown in FIGS. 1 and 4.

The flight equipment Fb includes a drone (aerial vehicle) 1b and a drone guard (protective member) 2b mounted to the drone 1b. The drone 1b is per se an aerial vehicle according to an embodiment of the present invention.

The drone 1b includes a body 11, arms 12b, and a plurality of rotors 13. The drone guard (protective member) 2b includes: a plurality of support members 22b connectable to the drone 1b; guard parts (flexible members) 23 that are stretched between distal end portions of the plurality of support members 22b so as to surround at least a body 11 in planar view; and mounting parts 21 attached to the distal end portions of the support members 22b and holding the guard parts 23.

The drone 1b has tension adjusting mechanisms 3b each configured to adjust the length of an associated one of the arms 12b. Each tension adjusting mechanism 3b is disposed on the associated arm 12 so as to be closer to the distal end of the arm 12 (closer to the outside) than the portion holding the associated rotor 13 is. In other words, in the drone 1b, each tension adjusting mechanism 3b adjusts the length of the associated arm 12b, and consequently, changes the distance from the center of the body 11 to the distal end portion of the associated support member 22b, thereby enabling adjustment of a tension applied to the guard parts 23 in the stretching direction.

Each support member 22b of the present embodiment is composed of an arm connecting part 221b connectable to the arm 12b, and a guard connecting part 222 attached to the distal end portion of the arm connecting part 221b, while having no movable part.

The tension adjusting mechanism 3b can be specifically configured by the arm 12b that has an arm body 701 extending from the body 11, and a movable end portion 702 which is attached, in a projectable and retractable manner, to the distal end of the arm body 701 toward the outside in the horizontal direction, and to which the support member 22b is connected. As a way of attaching the movable end portion 702 to the arm body 701, engagement with a screw is applicable.

The present embodiment also allows the user or any other person to easily attach and detach the drone guard 2b by relaxing the guard parts 23 by means of the tension adjusting mechanisms 3b, and to properly protect the drone 1b in the use state by causing the tension adjusting mechanisms 3b to apply a tension to the guard parts 23.

Three embodiments of the present invention have been described in the foregoing. However, the present invention is not limited to the embodiments described above, but encompasses variations, modifications, etc. within the scope in which the object of the present invention can be achieved. Further embodiments of the present invention will be described below. Note that the components common to or similar to those of the embodiments described above are denoted by the same reference characters, and the detailed description thereof may be omitted.

The protective member and the flight equipment according to each embodiment of the present invention do not have to include the dedicated flexible member, and may be used with a flexible member provided separately by the user. Examples of general-purpose articles usable as the flexible member include various ropes and wires, resin bands and metal bands for packaging or binding, etc.

The aerial vehicle and the flight equipment according to each embodiment of the present invention may include a tension adjusting mechanism that changes the angles of the support members by pivoting distal end portions of the arms of the drone (and thus, the support members connected to the distal end portions).

For the protective member, the aerial vehicle and the flight equipment according to each embodiment of the present invention, the number of the support members for supporting the flexible member(s) is not limited to six, but can be any number equal to or greater than three. For the protective member, the aerial vehicle and the flight equipment according to each embodiment of the present invention, the number of the tension adjusting mechanisms can be any number equal to or greater than one. However, since associating a plurality of tension adjusting mechanisms with one support member results in an unnecessarily complicated configuration, it is preferable to limit the number of the tension adjusting mechanisms to the number of the support members.

The protective member and the mounting parts of the flight equipment of each embodiment of the present invention may be integral with the extension parts. Further, the mounting part configured not to fasten the flexible member thereto may have a pulley, a guide groove or the like for guiding the flexible member, in place of the holder ring.

For example, in the above embodiments, the configuration has been described in which the tension adjusting members are provided at both ends of the guard part. However, the present invention is not limited to this configuration. A configuration is conceivable in which one tension adjusting member (tension applying part) is disposed only at one end in the stretching direction of the flexible member, and the other end in the stretching direction is simply fastened. Also in this configuration, the one end of the flexible member is pulled, thereby bringing the flexible member into a tense state.

The protective member and the flight equipment according to each embodiment of the present invention may further include a mechanism that adjusts a tension applied to the flexible member without moving the distal end portion of the support member. Examples of such a mechanism include a mechanism that adjusts the tension by moving an end of the flexible member in the stretching direction.

Further, in the protective member and the flight equipment according to each embodiment of the present invention, the flexible member(s) does not have to be stretched planarly, but may be stretched three-dimensionally. Specifically the protective member and the flight equipment according to each embodiment of the present invention may further include, in addition to the support members connected so as to extend horizontally outwardly with respect to the aerial vehicle, support members connected so as to extend vertically with respect to the aerial vehicle, and a flexible member stretched between the distal end portions of the support members so as to protect the aerial vehicle from vertical impacts. For example, in each of the above embodiments, an additional flexible member may be stretched in a shape (e.g., a triangle, a trapezoid, an arch shape, etc.) that covers an upper portion of the body in side view.

For example, in each embodiment described above, the drone is exemplified as the aerial vehicle. However, the aerial vehicle is not particularly limited to the drone, and any aerial vehicle including a manned aerial vehicle may be employed suitably.

As described above, the embodiments of the present invention achieve advantageous effects due to the following configurations.

Flight equipment (e.g., flight equipment F, Fa, Fb) includes: an aerial vehicle (e.g., a drone 1, 1a, 1b) having a body (e.g., a body 11) and at least one rotor (e.g., a rotor 13) held on the body; and a protective member having a plurality of support members (e.g., support members 22, 22a, 22b) that are connected to the aerial vehicle and have a flexible member (e.g., a guard part 23) stretched between distal end portions thereof so as to surround an outside of the body. The aerial vehicle or the protective member has a tension adjusting mechanism (e.g., a tension adjusting mechanism 3, 3a, 3b) that is capable of adjusting a tension applied to the flexible member in a stretching direction, by changing a distance from a center of the body to the distal end portion of at least one of the plurality of support members. Thus, during flight, the flexible member is maintained under a strong tension through adjustment of the tension adjusting mechanism so that the flexible member can effectively absorb an impact. In a non-use state, the flexible member can be easily deformed into a desired shape. For example, in some cases, the user or any other person uses a dedicated case to carry flight equipment. The user can deform the flexible member in conformity with the size of the dedicated case, and can carry the protective member together with the aerial vehicle. Thus, fight equipment can be achieved to which a protective member is easily mounted and which is easy to carry.

At least one of the plurality of support members may have: a fastenable part (e.g., an arm connecting part 221) that is configured to be fastened to the aerial vehicle; and a movable part (e.g., a movable part 223) that has a proximal end portion overlapping with, and held on, the fastenable part, and has a distal end portion holding the flexible member, and the tension adjusting mechanism may be configured to adjust an overlap length between the movable part and the fastenable part. With this configuration, movement of the distal end portion of the support member can cause a relatively significant change in the tension applied to the flexible member. Thus, the tension applied to the flexible member can be adjusted with efficiency.

The tension adjusting mechanism may be configured as a mechanism for engaging the movable part with the fastenable part. This feature makes it possible to accurately and easily adjust the tension applied to the flexible member, while the tension adjusting mechanism has a relatively simple structure.

At least one of the plurality of support members may have: a fastenable part (e.g., an arm connecting part 221a) that is configured to be fastened to the aerial vehicle; and a movable part (e.g., a movable part 223a) that has a proximal end portion pivotably connected to a distal end portion of the fastenable part and has a distal end portion holding the flexible member, and the tension adjusting mechanism may be configured to adjust an angle formed by the movable part with the fastenable part. This feature makes it possible to move the distal end portion of the support member by a relatively large amount, thereby enabling the tension applied to the flexible member to be changed significantly.

The tension adjusting mechanism may move the distal end potion of the support member in a plane perpendicular to a rotation axis of the rotor. With this feature, a change in the tension applied to the flexible member does not cause a change in the height of the flexible member, thereby ensuring the protection of the rotor and other components.

The protective member may further include a band-shaped flexible member that is stretched between the distal end portions of the plurality of the support members. Thus, the flexible member has appropriate properties, thereby ensuring the protection of the rotor and the other components.

A thickness direction of the flexible member may be perpendicular to the rotation axis of the rotor. In case where the flight equipment accidentally collides with an object, this feature contributes to reduction of damage to the object.

An aerial vehicle (e.g., a drone 1b) includes: a body (e.g., a body 11); and at least one rotor (e.g., a rotor 13) held on the body, the aerial vehicle being adapted to be mounted with a plurality of support members that have a flexible member (e.g., a guard part 23) stretched between distal end portions thereof so as to surround an outside of the body. The aerial vehicle includes a tension adjusting mechanism (e.g., a tension adjusting mechanism 3b) that is capable of adjusting a tension applied to the flexible member in a stretching direction, by changing a distance from a center of the body to the distal end portion of at least one of the plurality of support members. As a result, during flight, the flexible member is maintained under a strong tension through adjustment of the tension adjusting mechanism so that the flexible member can effectively absorb an impact. In a non-use state, the flexible member can be easily deformed into a desired shape. Thus, fight equipment can be achieved to which a protective member is easily mounted and which is easy to carry.

A protective member (e.g., a drone guard 2, 2a) mountable to an aerial vehicle (e.g., a drone 1, 1a) having a body (e.g., a body 11) and at least one rotor (e.g., a rotor 13) held on the body includes: a plurality of support members (e.g., support members 22, 22a) that are connectable to the aerial vehicle and have a flexible member (e.g., a guard part 23, 23a) stretched between distal end portions thereof so as to surround an outside of the body, wherein at least one of the plurality of support members has a tension adjusting mechanism (e.g., a tension adjusting mechanism 3, 3a) that is capable of adjusting a tension applied to the flexible member in a stretching direction, by changing a distance from a center of the body to the distal end portion. Thus, during flight, the flexible member is maintained under a strong tension through adjustment of the tension adjusting mechanism so that the flexible member can effectively absorb an impact. In a non-use state, the flexible member can be easily deformed into a desired shape. Thus, a protective member can be achieved which is easy to carry while ensuring enhanced mountability to an aerial vehicle such as a drone.

A reference embodiment related to the protective member, the aerial vehicle and the flight equipment according to each embodiment of the present invention will be described below. The following reference embodiment has a mechanism that adjusts a tension applied to a flexible member without moving the distal end of a support member.

Figure 7:
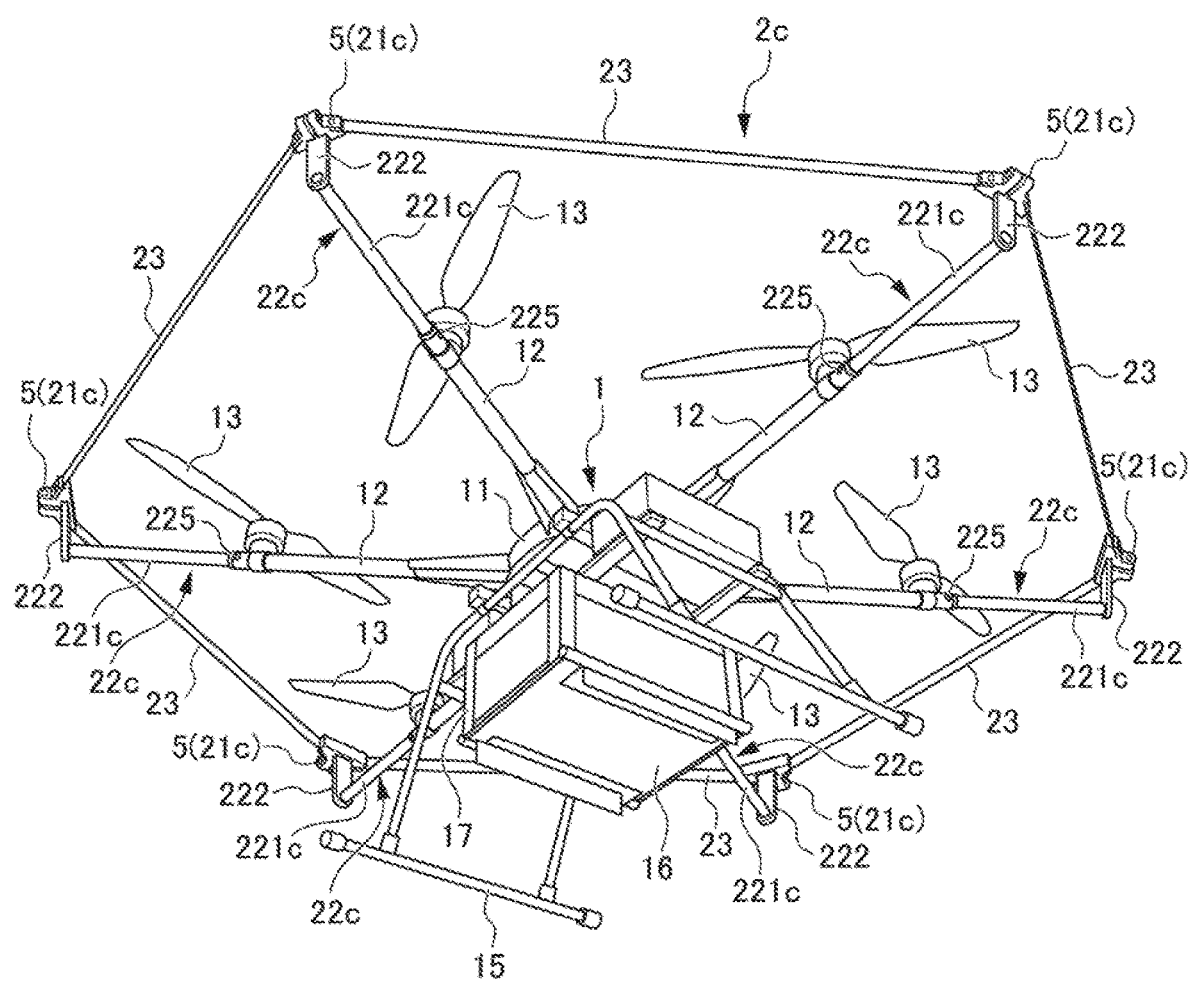
FIG. 7 is a perspective view showing an exemplary configuration of a drone mounted with a drone guard according to a reference embodiment.
Figure 8:
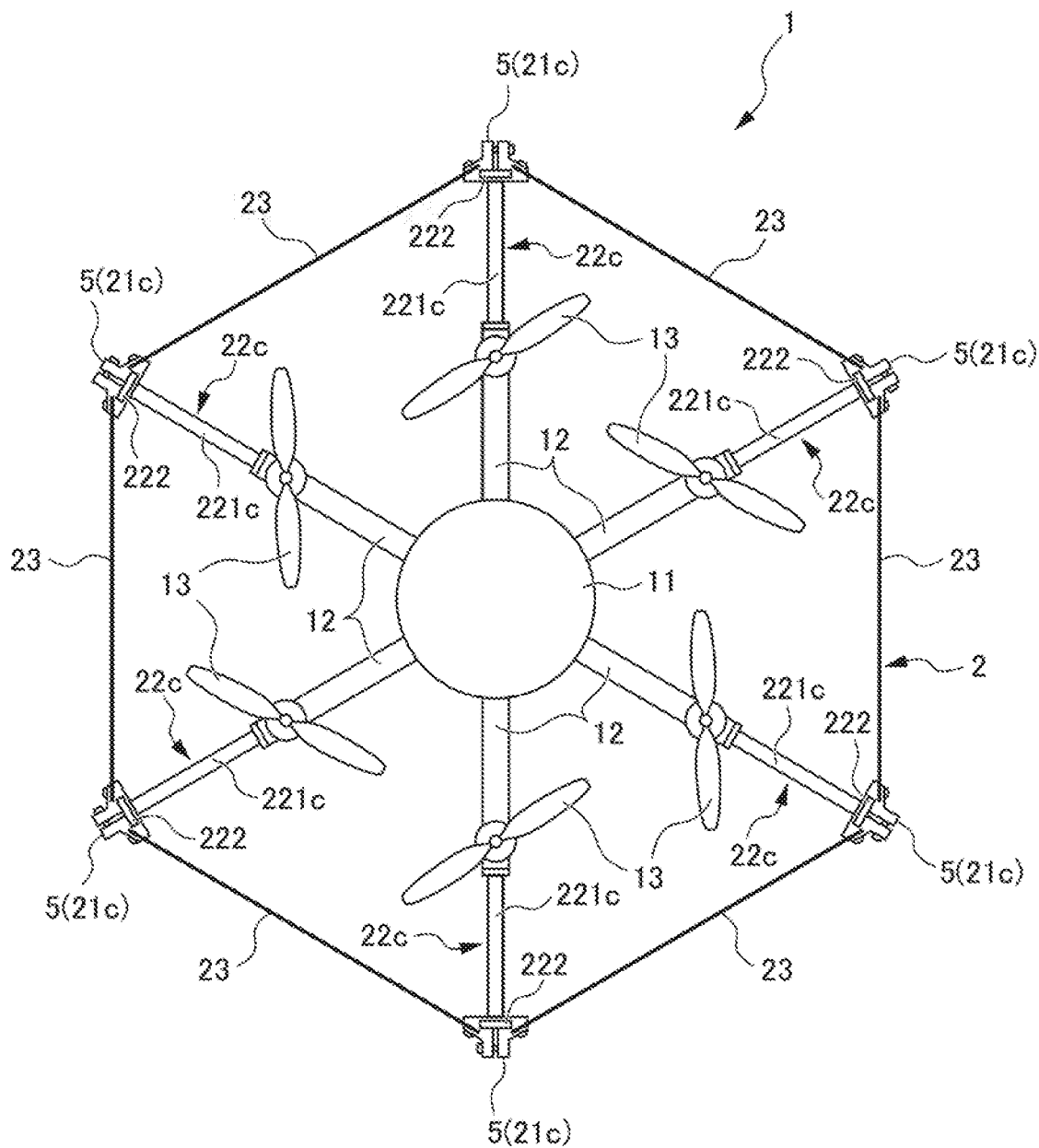
FIG. 8 is a schematic planar view showing the drone of FIG. 7.

FIG. 7 is a perspective view showing an exemplary configuration of a drone mounted with a rotor guard 2c according to the reference embodiment. FIG. 8 is a schematic planar view of the drone 1 of FIG. 7. Note that FIG. 8 shows the drone 1 schematically as compared with FIG. 7, while omitting part of the configuration of the drone 1.

As shown in FIGS. 7 and 8, the drone 1 flies while having the rotor guard 2c mounted thereto. The rotor guard 2c is configured to be mounted to the drone 1, and functions as a protective member for preventing rotors 13 and other components from colliding directly with buildings and trees during flight of the drone 1, and for protecting the drone 1 from external impacts.

First, the overall configuration of the drone 1 will be described. The drone 1 of the present reference embodiment includes a body 11, arms 12, rotors 13, support members 22c, and the rotor guard 2c.

The body 11 incorporates an electronic device (not shown) for executing various kinds of control processing required for flight and other operations of the drone 1. For example, the electronic device is a computer that controls a motor for driving the rotors 13, transmits and receives signals to and from external devices such as a controller operated by an operator of the drone 1 (hereinafter may be referred to also as the "user"), and performs processing based on information from various sensors such as a camera (not shown) provided on the body 11.

The lower surface of the body 11 is provided with, for example, legs 15 that come into contact with the landing plane and a holder frame 17 that holds a box 16 for accommodating a delivery target.

Each arm 12 is formed in a rod shape extending in the horizontal direction. One of the end portions of the arm 12 is connected to the body 11, and the other (hereinafter, referred to as the distal end portion) is provided with the rotor 13. In the present reference embodiment, the six (plurality of) arms 12 extend radially and symmetrically from the body 11 in planar view. The six arms 12 are equally spaced apart from each other in a circumferential direction.

Each rotor 13 is rotatably provided on an upper surface of the distal end portion of an associated one of the arms 12. The rotors 13 are mounted to the arms 12 such that their planes of revolution coincide with a horizontal plane. In the present reference embodiment, each of the six arms 12 is provided with the rotor 13. The six rotors 13 in total of the drone 1 rotate to generate lift for the drone 1 to fly.

The support members 22c are usable to mount the rotor guard 2c to the drone 1. In the present reference embodiment, the distal end portion of each of the six arms 12 is provided with the support member 22c. Thus, six support members 22c in total hold the rotor guard 2c. Each of the six support members 22c of the present reference embodiment includes: an arm connecting part 221c formed in a rod shape; and a guard connecting part 222 formed in an elongated flat plate shape. The guard connecting part 222 is connected to one end portion of the arm connecting part 221c. The support member 22c has a substantial L-shape as a whole.

The arm connecting part 221c is connectable to the distal end portion of the arm 12. The arm connecting part 221c of the present reference embodiment has, at one end portion (hereinafter, referred to as the inner end portion), a rotation mechanism 225, and is rotatable with respect to the distal end portion of the arm 12. Therefore, the drone 1 can be carried in a state where the support members 22c are folded. To use the drone 1, as shown in FIG. 1, the drone 1 is brought into a state where the arm connecting parts 221c of the support members 22c extend in the horizontal direction (hereinafter, this state is referred to as the use state of the support members 22c).

The guard connecting parts 222 are parts connected to the rotor guard 2c. Each guard connecting part 222 is connected to an end portion (hereinafter, referred to as the outer end portion) of the associated arm connecting part 221c, the end portion being opposite to the inner end portion. In the use state of the support members 22c, the longitudinal direction of the guard connecting parts 222 is directed upward.

Next, the rotor guard 2c will be described. As schematically shown in FIG. 2, the rotor guard 2c is provided outside the rotors 13 as viewed from the body 11 of drone 1. Here, the term "outside" means a side away from the rotors 13 in both stationary and rotating states as viewed in planar view when the center of gravity or the center of the body 11 of the drone 1 is defined as the base point. The "outside" can also be expressed as radially outward while the base point is set to be the center of a sphere. The rotor guard 2c is arranged to surround the rotors 13, whereby the rotors 13 are prevented from colliding directly with buildings and trees. In addition, the rotor guard 2c is disposed at the same height as the rotors 13 or at a position higher than the rotors 13. According to the drone 1 of the present reference embodiment, when the drone 1 descends, the legs 15 arranged below the body 11 and the rotors 13 can prevent damage to the rotors 13, and when the drone 1 ascends, the rotor guard 2c, which is positioned at the same height as the rotors 13 or at a position higher than the rotors 13, can effectively prevent damage to the rotors 13.

A configuration of the rotor guard 2c of the present reference embodiment will be described. The rotor guard 2c includes: a plurality of guard parts (flexible members) 23 that are stretched around the drone 1 in planar view; and a plurality of tension adjusting members 5 that can adjust a tension applied to the guard parts 23.

Each guard part 23 is configured as an elongated band-shaped member made of a flexible and elastic material, examples of which include carbon fiber composite materials such as carbon fiber reinforced plastics (CFRP). As shown in FIG. 2, the guard parts 23 are stretched so 33 to connect the guard connecting parts 222 to each other, the guard connecting parts 222 being located at the outer ends of the six support members 22c. That is, in planar view, the six (plurality of) guard parts 23 form a hexagon (polygon), inside which all of the plurality of rotors 13 are located. In the following description, the direction along the longitudinal direction of the guard parts 23, that is, the direction along the circumferential direction of the entire rotor guard 2c will be defined as the "stretching direction".

Each tension adjusting member 5 is made of a deformable material, examples of which include an aluminum alloy subjected to anodizing. Note that the tension adjusting member 5 may be made of an elastically deformable resin material.

Figure 9:
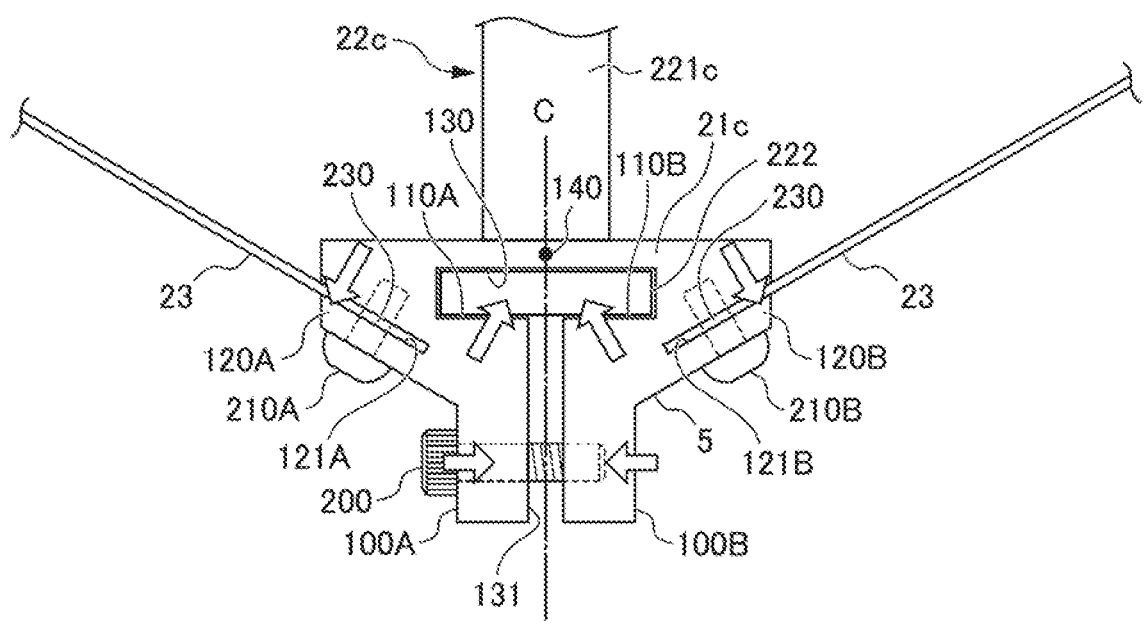
FIG. 9 is a schematic planar view showing a tension adjusting member of the drone guard of FIG. 7.

A configuration of the tension adjusting member 5 will be described. FIG. 9 is a planar view showing the tension adjusting member 5 of the rotor guard 2c of the present reference embodiment. The tension adjusting member 5 has a shape symmetrical about a vertical dash-dot line C in FIG. 9. Note that the vertical dash-dot line C in FIG. 9 is a virtual straight line passing through the center of the tension adjusting member 5 in planar view. In the following description of the tension adjusting member 5, even though members are identical with each other, one of the members that is shown on the left side in FIG. 9 is denoted by a reference character ending with "A" while the other shown on the right side in FIG. 9 is denoted by a corresponding reference character ending with "B", for the purpose of distinguishing the members from each other. Nevertheless, the letters "A" and "B" are omitted in the following description when the members do not particularly need to be distinguished from each other.

The tension adjusting member 5 of the present reference embodiment includes: a mounting part 22c to which the guard connecting part 222 of the support member 22c is fixed; a tension applying part 120 to which the guard parts 23 are connected; and a tension adjusting part 100 to which an adjusting bolt 200 is fastened, the adjusting bolt 200 being usable to adjust the tension applied to the guard parts 23 by the tension applying part 120. The mounting part 21c, the tension applying part 120 and the tension adjusting part 100 are integrally formed into a shape in which deformations of the respective parts interact with each other.

The mounting part 21c has a fitting hole 130 in which an end portion of the support member 22c (guard connecting part 222) is fixed. The fitting hole 130 has a rectangular shape in planar view, and penetrates the mounting part 21c in the vertical direction. The fitting hole 130 is in such a positional relationship that the fitting hole 130 is interposed between the tension applying parts 120A and 120B in the stretching direction. The distal end potion of the guard connecting part 222 has a length and a width that are substantially the same as or slightly smaller than those of the fitting hole 130 in a state where the adjusting bolt 200 is not tightened.

The tension applying parts 120A and 120B constitute both side portions of the tension adjusting member 5, respectively, and are integral with part of the inner wall of the fitting hole 130. The tension applying parts 120A and 120B have slits 121A and 121B, respectively. End portions of the guard parts 23 are inserted into the slits 121A and 121B. Both end portions of the guard part 23 are each formed into a connecting part 230 having a large width. The guard parts 23 are fastened to the tension applying part 120 through tightening a fixing screw 210A and a fixing screw 210B while having the connecting parts 230 inserted in the slits 121. It will be described later how the tension applying parts 120A and 120B operate.

The tension adjusting parts 100A and 100B are connected to the tension applying parts 120A and 120B, respectively, while forming part of the inner walls 110A and 110B of the fitting hole 130. The tension adjusting parts 100A and 100B face each other while sandwiching therebetween a gap 131 which communicates with the fitting hole 130 and through which the dash-dot line C passes. The adjusting bolt 200 is fastened to the tension adjusting part 100B while penetrating the tension adjusting part 100A. When the adjusting bolt 200 is screwed in a tightening direction, the tension adjusting part 100A and the tension adjusting part 100B move to come close to each other. When the adjusting bolt 200 is screwed in a direction opposite to the tightening direction, the tension adjusting part 100A and the tension adjusting part 100B move away from each other.

The rotor guard 2c can be in two states, namely, a use state shown in FIG. 7 in which the rotor guard 2c is in use to protect the rotors 13 when the drone 1 flies; and a non-use state (not shown) in which the rotor guard 2c is not used while the drone 1 is being carried by a user or is in storage. Next, a method for mounting the rotor guard 2c to the drone 1 and how the tension applying parts 120A and 120B operate will be described.

First, in order to bring the rotor guard 2c into the use state, the user or any other person brings the support members 22c into a use state such that the longitudinal direction of the arm connecting parts 221c coincides with the horizontal direction, as shown in FIG. 7. While maintaining this state as it is, the user fastens the mounting parts 21c to the guard connecting parts 222 of the support members 22c.

Figure 10:
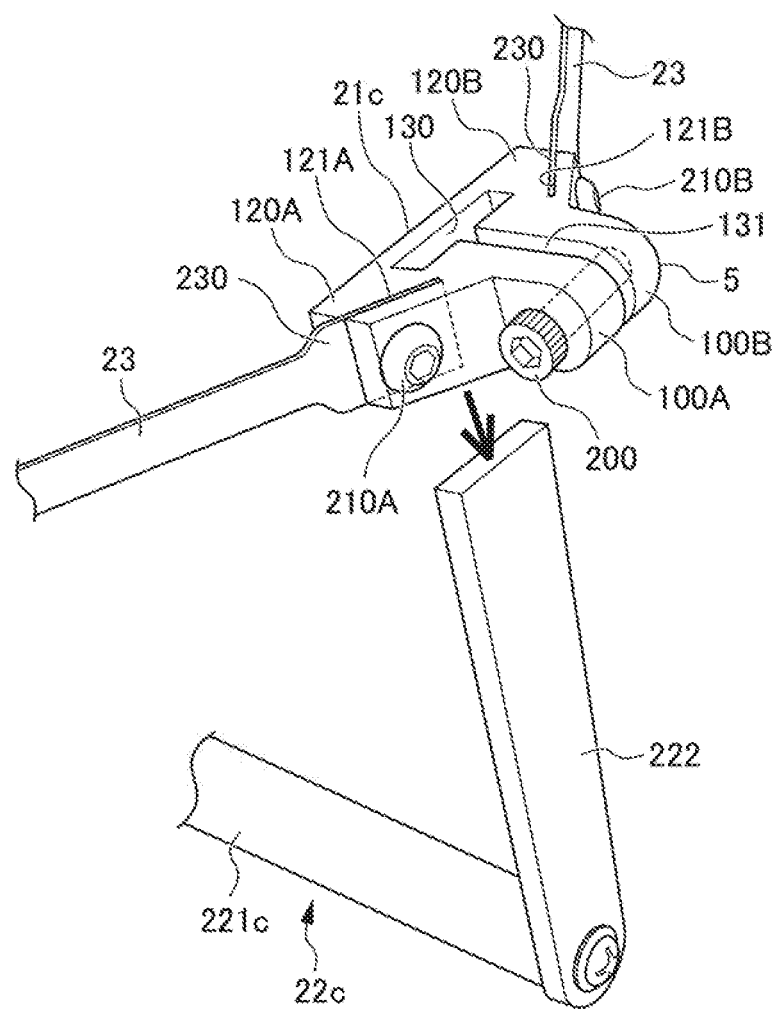
FIG. 10 is a perspective view showing the tension adjusting member that is not yet attached to a support member of FIG. 7.

FIG. 10 is a perspective view showing the tension adjusting member 5 that is not yet attached to the support member 22c. FIG. 10 shows a state in which the tension adjusting member 5 connected to the two guard parts 23 is not yet fastened to the support member 22c. As shown in FIG. 10, the distal end portion of the guard connecting part 222 of the support member 22c (the outer end portion of the support member 22c) in the use state is inserted into the fitting hole 130 of the tension adjusting member 5.

Figure 11:
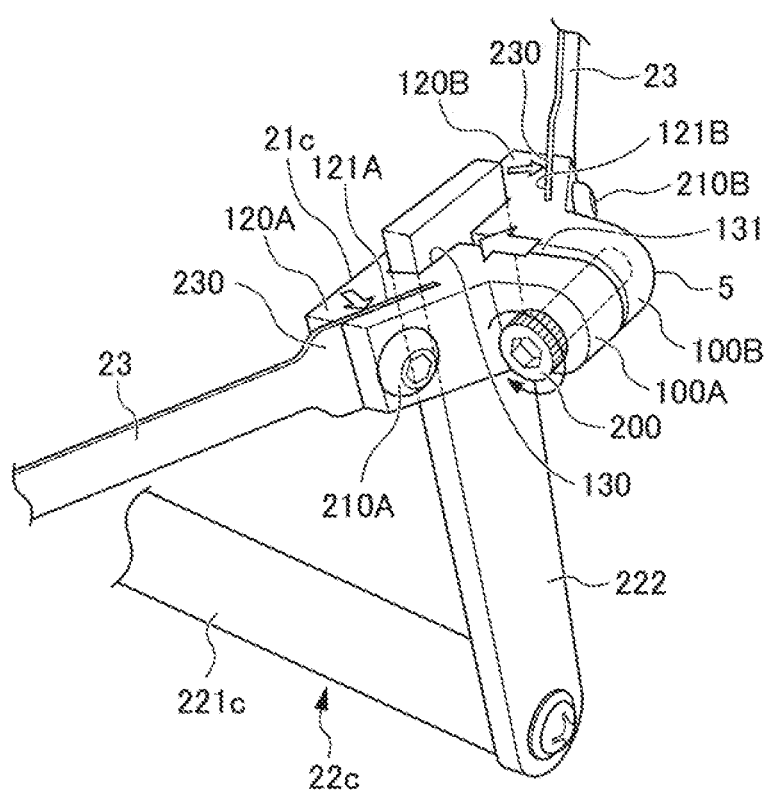
FIG. 11 is a perspective view showing the tension adjusting member that has been attached to the support member of FIG. 7.

FIG. 11 is a perspective view showing the tension adjusting member 5 that has been attached to the support member 22c. Next, as shown in FIG. 11, the adjusting bolt 200 is screwed in the tightening direction while the distal end portion of the inserted guard connecting part 222 penetrates the fitting hole 130.

Here, with reference to the white arrows in FIG. 9, it is described how the tension adjusting member 5 tightens the fitting hole 130 and applies a tension. The present reference embodiment is configured such that motion of the tension adjusting parts 100A and 100B for fastening the support member 22c to the fitting hole 130 takes place in conjunction with motion of the tension applying parts 120A and 120B for applying a tension. The former motion and the latter motion will be described separately.

When the tension adjusting parts 100A and 100B move to come close to each other due to tightening of the adjusting bolt 200, portions of the tension adjusting parts 100A and 100B constituting the inner walls 110A and 110B of the fitting hole 130 move in a direction to press the guard connecting part 222 (the support member 22c). Since the force tightening the adjusting bolt 200 acts in a direction to narrow the fitting hole 130, the guard connecting part 222 is fastened so as not to come off from the fitting hole 130.

When the tension adjusting parts 100A and 100B move to come close to each other due to tightening of the adjusting bolt 200, the tension adjusting member 5 deforms such that the tension applying part 120A connected to the tension adjusting part 100A is turned in a direction away from the body 31 of the drone 1 (in an outward direction) about a fulcrum 140 as a center of rotation, while the tension applying part 120B connected to the tension adjusting part 100B is turned in a direction away from the body 11 of the drone 1 (in an outward direction) about the fulcrum 140 as the center of rotation. As a result, the guard parts 23 respectively connected to the tension applying parts 120A and 120B are pulled outward, whereby a tension is applied.

The above-described motion through which the support member 22c is fastened to the fitting hole 130 and the motion through which the tension applying parts 120A and 120B apply a tension are triggered substantially simultaneously by the movement of the tension adjusting parts 100A and 100B. Specifically, a single operation of tightening the adjusting bolt 200 causes a fastening force of the adjusting bolt 200 to be transmitted from the tension adjusting part 100 to each of the inner wall 110 and the tension applying part 120, resulting in that the tightening of the fitting hole 130 and the application of tension by the tension applying part 120 take place. Then, the strength of the force tightening the fitting hole 130 and the strength of the tension applied to the tension applying part 120 can be adjusted in accordance with a degree of tightening of the inserted adjusting bolt 200. In other words, the mounting part 21c for mounting the rotor guard 2c functions also as the tension adjusting member 5. The tension adjusting member 5 is attached to each of the six support members 22c.

Figure 12A:
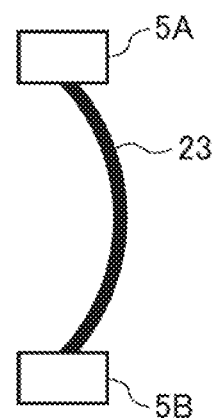
FIG. 12A is a diagram schematically showing a guard part before application of a tension, and tension adjusting members respectively connected to both ends of the guard part.
Figure 12B:
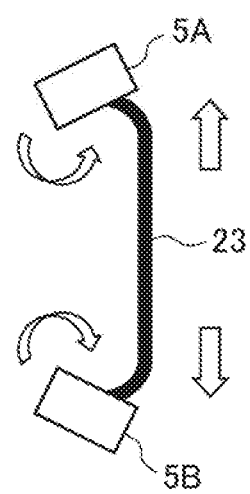
FIG. 12B is a diagram schematically showing the guard part with the tension applied thereto, and the tension adjusting members respectively connected to both ends of the guard part.

Each guard part 23 have both ends provided with the tension adjusting members 5, and receives a tension applied thereto, the tension pulling the guard part 23 in the stretching direction toward the tension adjusting members 5 at both ends. Here, a tension applied to one guard part 23 from both ends thereof will be described with reference to FIGS. 12A and 12B. FIG. 12A is a diagram schematically showing the guard part 23 before application of the tension, and the tension adjusting members 5A and 5B respectively connected to both ends of the guard part 23. FIG. 12B is a diagram schematically showing the guard part 23 with the tension applied thereto, and the tension adjusting members 5A and 5B respectively connected to both ends of the guard part 23.

FIG. 12A shows a state in which the adjusting bolts 200 of the tension adjusting members 5A and 5B are yet to be tightened, and in which the guard part 23 is relatively relaxed and easily deformed by a force applied externally. In the state shown in FIG. 12A, the adjusting bolts 200 of the tension adjusting members 5A and 5B are tightened. Consequently, the tension applying part 120 of each of the tension adjusting members 5A and 5B is turned about the fulcrum 140 as the center of the rotation, in a direction away from the body 11 of the drone 1. As a result, the guard part 23 is pulled toward each of the tension adjusting members 5A and 5B. Thus, the guard part 23 is brought into the state shown in FIG. 12B.

As shown in FIG. 12B, when the adjusting bolts 200 are tightened, the tension applying parts 120 of the tension adjusting members 5A and 5B are turned in a direction in which the tension applying parts 120 move away from each other while rolling the guard part 23 outwardly. Consequently, the guard part 23 is pulled by the tension adjusting members 5A and 5B so as to be brought into a state tenser than the state shown in FIG. 12A. As a result, the flexure of the guard part 23 is eliminated, and the guard part 23 enters a state in which the guard part 23 is less likely to be displaced in a direction perpendicular to the stretching direction.

The mounting parts 21c of the tension adjusting members 5 are attached to all of the six support members 22c (guard connecting parts 222), and the adjusting bolt 200 of each of the tension adjusting members 5 is tightened. As a result, the guard parts 23 are stretched in the circumferential direction while a suitable tension is applied to the guard parts 23. In this way, the operation of mounting the rotor guard 2c to the drone 1 is completed. As described earlier, in the use state, the rotor guard 2c of the present reference embodiment has the guard parts 23 stretched in a hexagonal shape and radially symmetrically with respect to the drone 1. In the present reference embodiment, the guard parts 23 are supported on the L-shaped support members 22c so that the guard parts 23 are positioned at the same height as the rotors 13 or higher than the rotors 13.

Figure 13:
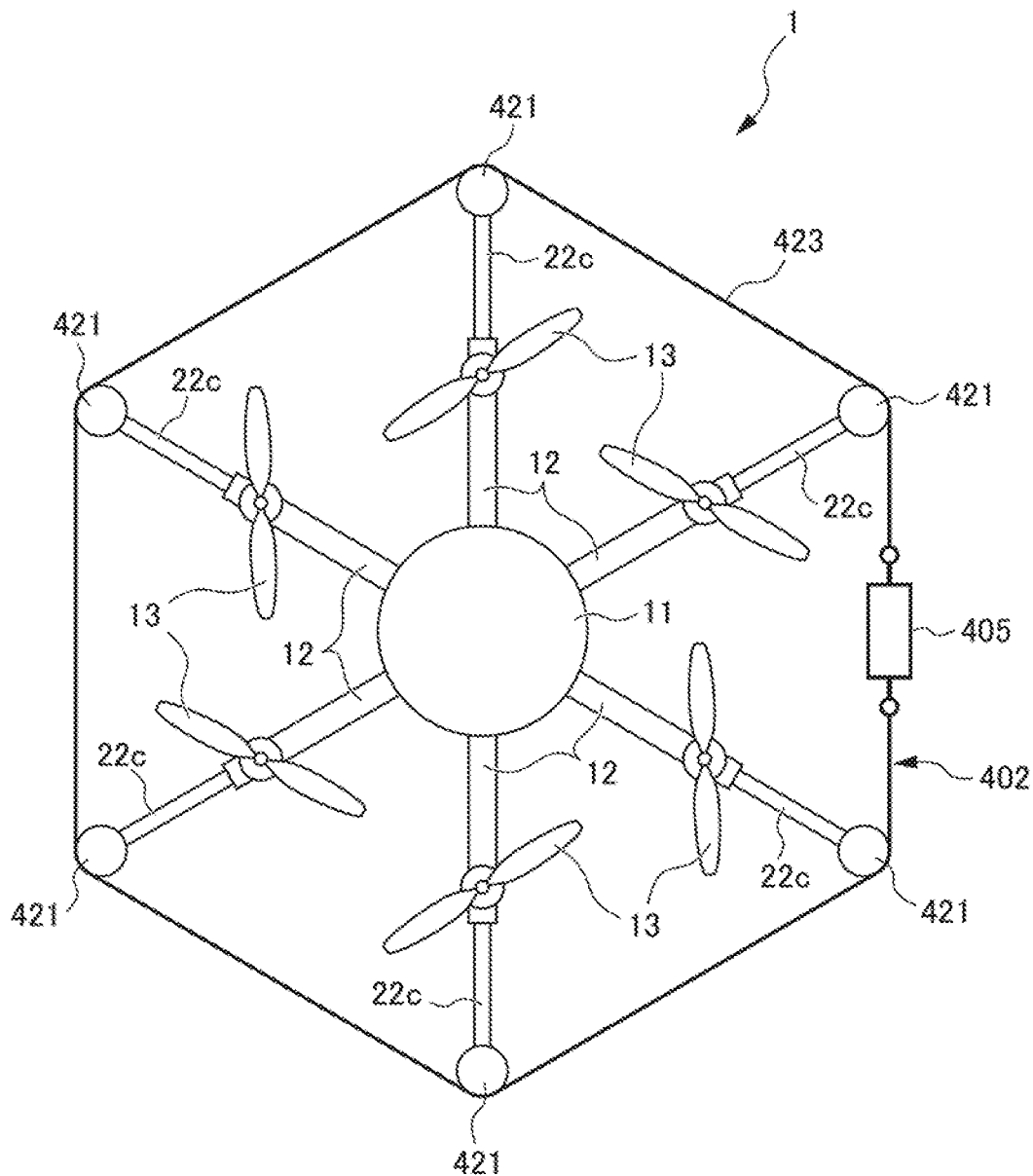
FIG. 13 is a schematic planar view showing a drone with a drone guard of a first modification applied thereto.

In the above reference embodiment, the example in which the tension adjusting member 5 is integral with the mounting part 21c has been described. However, it is only necessary for the tension adjusting member 5 to have the function of adjusting a tension applied to the guard part (flexible member) 23. The tension adjusting member 5 may be configured not to function also as the mounting part 21c. Next, a first modification will be described in which the tension adjusting member is configured differently. FIG. 13 is a schematic planar view showing a drone with a rotor guard 402 of the first modification applied thereto. The rotor guard 402 shown in FIG. 13 includes: a plurality of engaging parts 421; one guard part 423 that is stretched between the plurality of engaging parts 421; and one tension adjusting member 405 for applying a tension to the guard part 423.

In the first modification, the engaging parts 421 are fixed to the outer end portions of the six support members 22c on a one-to-one basis. The six engaging parts 421 in total arranged on the support members 22c are all formed so as to allow the guard part 423 to move in the stretching direction (circumferential direction). For example, each engaging part 421 may be configured as a slide mechanism that has a recessed peripheral surface with which the guard part 423 is engaged, and that allows the engaged guard part 423 to slide in the stretching direction in accordance with a degree of the applied tension. Alternatively, each engaging part 421 may be constituted by a rotatable roller, and the guard part 423 may be wrapped on the circumferential surfaces of the rollers. With this configuration, the guard part 423 moves in the stretching direction in accordance with a degree of the applied tension while the rollers are rotating.

The guard part 423 is a band-shaped or linear member made of a single flexible and elastic material. For example, the guard part 423 is constituted by a material such as a carbon fiber composite material or rubber. In this modification, the single guard part 423 is wrapped on the six engaging parts 421 so as to form a hexagonal loop in planar view. All of the rotors 13 of the drone 1 are positioned inside the loop formed by the guard part 423.

The tension adjusting member 405 is arranged on the guard part 423 between the support members 22c, and is a member separate from the engaging parts 421 fixed to the support members 22c. The tension adjusting member 405 is connected to both one end of the guard part 423 and the other end of the guard part 423. The tension adjusting member 405 applies a tension in the stretching direction to the guard part 423 by moving the one end and the other end of the guard part 423, which is stretched in a loop shape, close to each other. The tension adjusting member 405 of this modification has a tension adjustor (not shown) constituted by a screw mechanism or the like, and is capable of adjusting a pull-in amount of the guard part 423 by the tension adjustor. The tension adjusting member 405 is configured to operate such that screwing the screw mechanism of the tension adjustor in a predetermined direction increases the pull-in amount of the guard part 423, and screwing the screw mechanism in the opposite direction reduces the pull-in amount.

As described earlier, in this modification, the single guard part 423 forms a loop surrounding the rotors 13. Therefore, when the one end and the other end of the guard part 423 are moved to come close to each other in the stretching direction, the guard part 423 wrapped on the engaging parts 421 moves to be pulled into the tension adjusting member 405, and consequently, is brought into a state in which a tension is applied to the entire the guard part 423. Conversely, when the tension adjusting member 405 moves the one end and the other end of the guard part 423 away from each other in the stretching direction, the guard part 423 is brought into a relatively relaxed state.

To mount the rotor guard 402 to the drone 1, a user wraps the guard part 423 on the engaging parts 421, and thereafter, increases the pull-in amount of the guard part 423 using the tension adjusting member 405, whereby the guard part 423 is brought into a state in which a tension is applied to the guard part 423 over its entire circumference. Thus, it is possible to adopt this configuration in which the single tension adjusting member 405 applies a tension to the guard part 423 that is stretched between the plurality of engaging parts 421.

Figure 14:
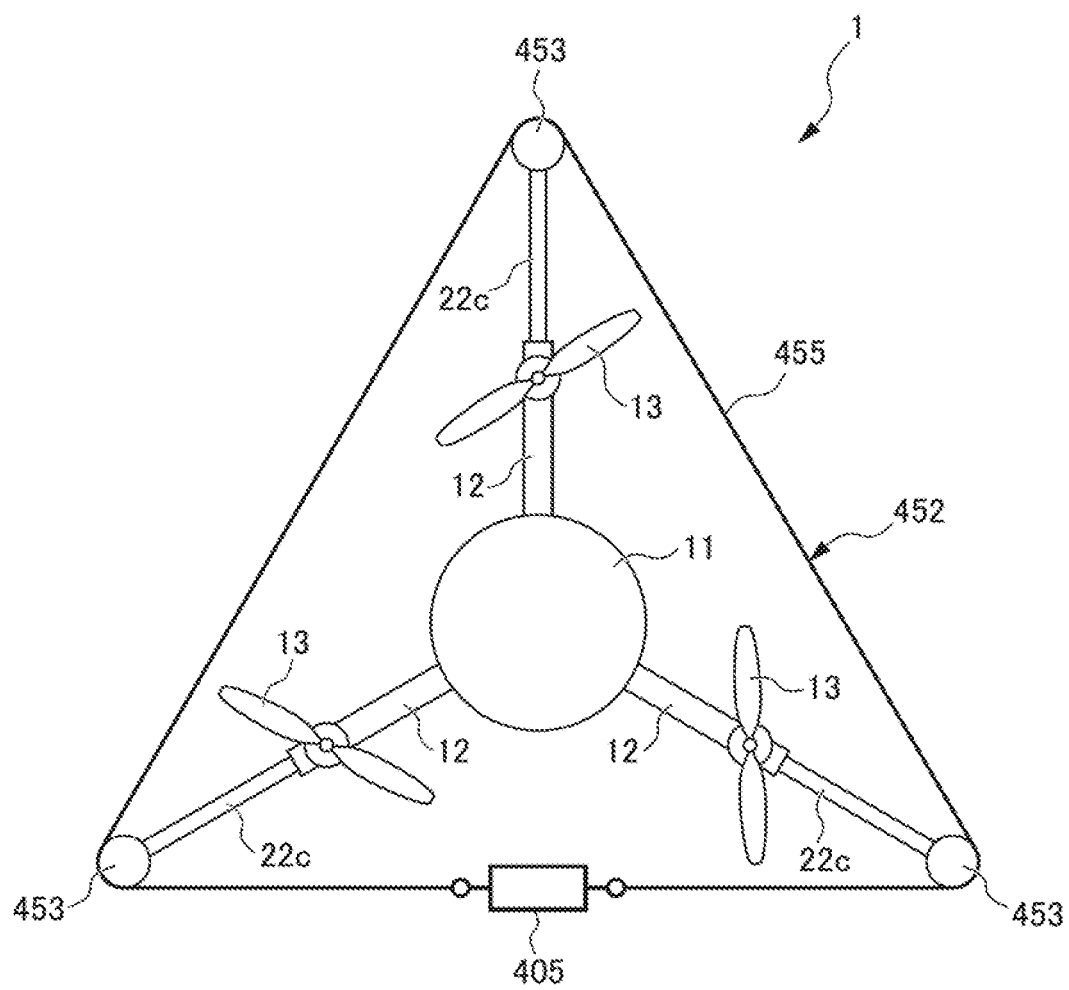
FIG. 14 is a schematic planar view showing a drone with a drone guard of a second modification applied thereto.

Next, a second modification will be described in which the same configuration as of the first modification is applied to a drone 1 having a different configuration. FIG. 14 is a schematic planar view showing the drone 1 with a rotor guard 452 of the second modification applied thereto. As shown in FIG. 14, the drone 1 of the second modification has a configuration in which three arms 12 extend from a body 11, and support member 22c are arranged on the arms 12 on a one-to-one basis. Engaging parts 453 that are similar to those of the first modification are arranged on the outer end portions of the support members 22c. In the second modification, one guard part 455 is wrapped on the engaging parts 453 so as to form a triangular loop in planar view. A tension adjusting member 405 of the second modification has a configuration similar to that of the first modification. That is, also in this modification, the single tension adjusting member 405 applies a tension to the guard part 455 over the entire circumference.

In each of the first and second modifications described above, the example has been described in which the tension adjusting member 405 is provided for the single guard part 423 or 455. However, regarding the tension adjusting member 405, the number is not limited to one. It is conceivable to arrange a plurality of tension adjusting members 405. For example, it is possible to adopt a configuration in which each side of a hexagonal or triangular loop is provided with the tension adjusting member 405, or a configuration in which the tension adjusting members 405 are arranged in an intermittent fashion. Further, the guard part 423 or 455 may be divided into a plurality of pieces, which are then formed into a single loop, and the tension adjusting member 405 may be provided to each of the pieces of the guard part.

Figure 15:
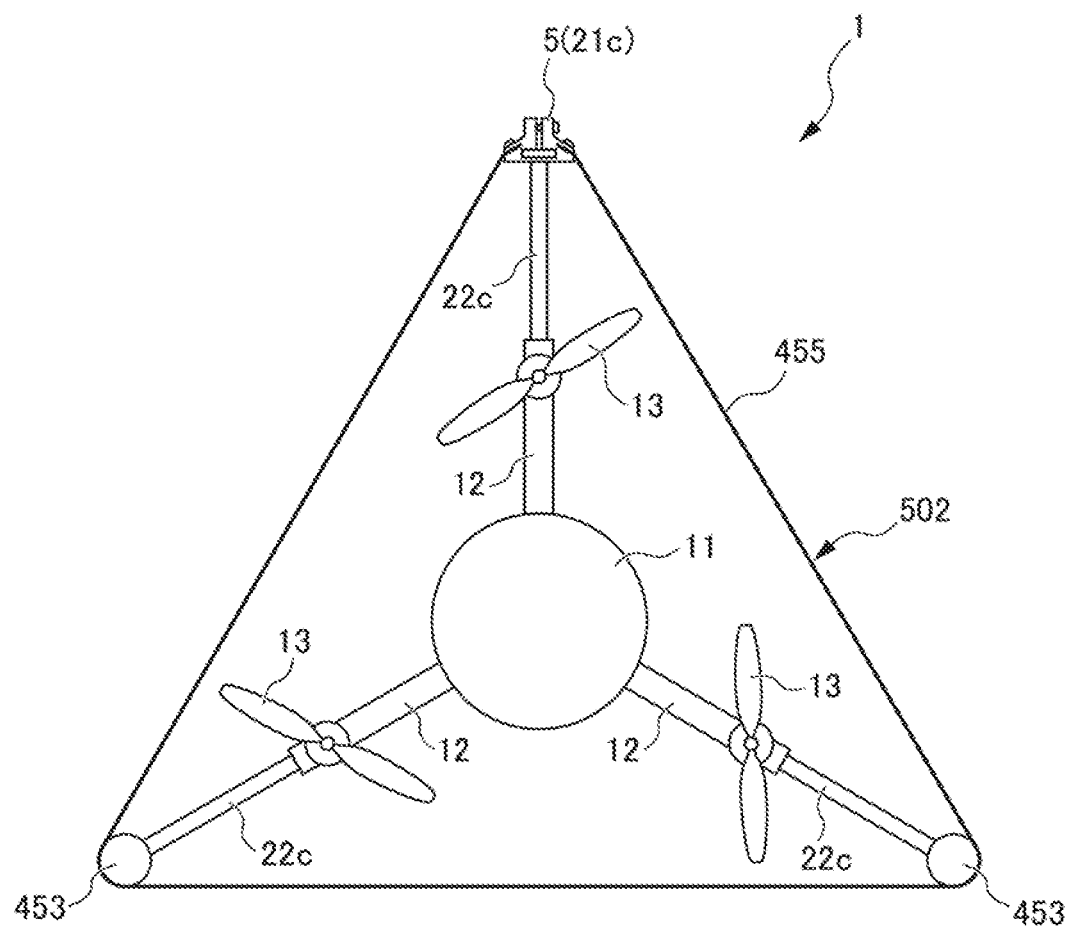
FIG. 15 is a schematic planar view showing a drone with a drone guard of a third modification applied thereto.

Further, in the configuration described in the second modification, the tension adjusting member 405 may be replaced with the tension adjusting member 5 described in the first reference embodiment, the tension adjusting member 5 being integral with the mounting part 21c. Next, a third modification will be described which corresponds to the second modification and includes the tension adjusting member 5 functioning also as the mounting part 21c, in place of the tension adjusting member 405. FIG. 15 is a schematic planar view showing a drone 1 with a rotor guard 502 of the third modification applied thereto.

As shown in FIG. 15, in the third modification, one of three support members 22c is provided with the tension adjusting member 5 functioning also as the mounting part 21c described in the first reference embodiment. The other two support members 22c are provided with the engaging parts 453 described in the first and second modifications. To mount the rotor guard 502 to the drone 1, in a state where the guard part 455 is wrapped on the two engaging parts 453, a user fixes the tension adjusting member 5 to the support member 22c. The guard part 455 has one end portion fastened to one side portion (the tension applying part 120A) of the tension adjusting member 5, and the other end portion connected to the other side portion (the tension applying part 120B) of the tension adjusting member 5. That is, the one end and the other end of the guard part 455 are connected to the same tension adjusting member 5. As described earlier, with the tension adjusting member 5, fastening to the support member 22c and application of a tension to the guard part 455 are completed through a single operation. Therefore, along with the fastening of the tension adjusting part 5 to the support member 22c, the application of a suitable tension to the guard part 455 is completed. Also in the third modification, the single guard part 455 forms a triangular loop in planar view.

As described above, in the configuration in which the tension adjusting member 5 functioning also as the mounting part 21c is provided to the single guard part 455, the single tension adjusting member 5 can apply a tension to the guard part 455 over the entire circumference.

As described above with reference to the first to third modifications, the shape of the loop formed by the guard part as the flexible member is not limited to the hexagonal shape. For example, the shape formed by the flexible member is not limited to the triangle described in the second and third modifications. The flexible member can form an appropriate shape such as a circle and a polygon having a three or more angles, example of which include a quadrangle, a pentagon, a heptagon, an octagon, etc. Further, the flexible member is not necessarily limited to a configuration that is continuous around the entire circumference. A gap may be formed in a portion of the circumference of the flexible member. In other words, the overall shape of the rotor guard (protective member) in the use state can be appropriately changed according to the shape of the drone, the number and arrangement of the rotors. In addition, the number of the tension adjusting members does not need to be the same as the number of the mounting parts. It is possible to adopt a configuration in which the number of the tension adjusting members is less than the number of the mounting parts. For example, a configuration can be adopted in which the guard part 455 of the third modification forms a polygonal loop having many angles, such as a hexagonal loop or a heptagonal loop, and a single tension adjusting member 5 applies a tension to the single guard part 455. In a configuration in which the number of the tension adjusting members is less than the number of the mounting parts (the number of the angles of a polygon formed by the rotor guard), if the number of the mounting parts is large, the guard part, is preferably made of a soft material. Consequently, in a case of using a material having a relatively high elasticity, a situation can be avoided where an insufficient tension is applied due to the tension adjusting members which are less in number than the mounting parts, and the guard part expands significantly outward.

As can be seen, an optional number of the flexible members, an optional number of the tension adjusting members, and an optional number of the mounting parts can be arranged at optional locations. The protective member can have various shapes and various configurations within a scope in which the protective member having not only simple mountability but also enhanced portability can be achieved.

For instance, in the above-described reference embodiment and modifications, the configuration in which the mounting part 21c and the support member 22c are fastened together by the adjusting bolt 200 has been described as an example. However, the present invention is not limited to this configuration. For example, the adjusting bolt 200 does not have to be used, and the outer end portion of the support member 22c to be fitted into the fitting hole 130 of the mounting part 21c may be configured as a dedicated connector or the like. Likewise, the configuration in which the fixing screw 210 is used to fasten the mounting part 21c and the guard part 23 together has been described as an example. However, the present invention is not limited to this configuration. For example, a fastener such as a buckle for fastening a belt may be used in place of the fixing screw 210.

For example, it is only necessary for the guard parts 23 and 423 to be constituted by a flexible member, properties of which are not particularly limited. For example, the flexible member may be made of a material other than the carbon fiber composite material and rubber, such as a soft resin or the like.

Further, for example, in the above-described reference embodiment and modifications, the configuration in which the six guard parts 23 form one loop and the configuration in which the single guard part 423 or 455 forms one loop have been described as examples. However, the present invention is not limited to these configurations. A configuration may be adopted in which two or more loops each formed by one or plurality of flexible members are arranged one above the other in the vertical direction. For example, the above-described reference embodiment may have a configuration in which a loop formed by a first flexible member is arranged at a position higher than the rotors 13, a loop formed by a second flexible member is arranged at substantially the same height as the rotors, and a loop formed by a third flexible member is arranged at a position lower than the rotors. Thus, the position, such as a height and a distance in the horizontal direction, of the flexible member with respect to the rotors can be appropriately changed depending on the circumstances.

Further, for example, in the above-described reference embodiment, the configuration in which the tension applied to the guard part 23 is adjusted by the tension adjusting member that deforms in accordance with screwing of the adjusting bolt 200 or the like has been described as an example of adjustment of the tension applied to the guard part 23. However, the present invention is not limited to this configuration. For example, it is possible to adopt, instead of the above-described configuration in which the tension adjusting member 5 deforms in part, a configuration in which the entire tension adjusting member deforms or a configuration in which a mechanical mechanism, such as a link mechanism, causes the motion of the tension applying part and the motion of the fitting hole to take place in conjunction with each other. For example, a configuration may be adopted in which a mechanism moving in a direction away from the center of the body 11 of the drone 1 (in a radially outward direction) applies a tension to the guard part, while the body 11 is defined as the center in planer view. Further, a configuration may be adopted in which movement of the tension applying part in the direction to apply a tension to the flexible member results in that the fitting hole is narrowed via a link mechanism. Furthermore, a configuration may be adopted in which a member that expands by injection of a fluid such as air is provided to cause motion of the tension applying part and that of the fitting hole to take place in conjunction with each other.

Moreover, for example, in the above-described reference embodiment, the support member 22c that is rotatable with respect to the arm 12 has been described as an example. However, the present invention is not limited to this configuration. The support member may be configured as a member retractable in the arm, a member detachable from the arm, or a member integral with the arm. Further, the protective member may include the support member. For example, the mounting part 21c and the support member 22c may be integral with each other.

For example, the above-described reference embodiment and modification may additionally include an adjustment mechanism that can adjust the horizontal length of the arm 12, the horizontal length of the support member 22c, and the height of the support member 22c. It is necessary that the rotors 13 can freely rotate without contacting with the rotor guard 2c and that the rotor guard 2c is mounted to the drone 1 and positioned so as to properly protect the rotors 13. With this modification, a single type of protective member can be applied to drones in different sizes.

For example, in the above-described reference embodiment, the configuration in which both end portions of the guard part are each provided with the tension adjusting member has been described. However, the present invention is not limited to this configuration. The tension adjusting member (tension applying part) may be provided only at one end portion of the flexible member in the stretching direction, and the other end portion in the stretching direction may be simply fastened. Also with this configuration, the one end portion of the flexible member is pulled, whereby the flexible member is brought into a tense state.

For example, in the above-described reference embodiment, the protective member is configured as the rotor guard mountable to the drone 1. However, the target to be mounted with the protective member is not particularly limited to the drone 1. The protective member is suitably mounted to aerial vehicles including a manned aerial vehicle.

That is to say, the following configurations provide advantages set forth below. A protective member (e.g., a rotor guard 2c, 402, 502) for an aerial vehicle (e.g., a drone 1) having at least one rotor (e.g., a rotor 13) is supported on support members (e.g. support members 22c) that are connectable to the aerial vehicle, and includes: a flexible member (e.g., a guard part 23, 423, 455) that is stretched to surround an outside of the at least one rotor in planar view; and a tension adjusting member (e.g., a tension adjusting member 5, 405) that is capable of adjusting a tension applied to the flexible member in a stretching direction. Thus, during flight, the flexible member is maintained under a strong tension through adjustment of the tension adjusting member so that the flexible member can effectively absorbs an impact. In a non-use state, the flexible member can be easily deformed into a desired shape. For example, in some cases, a user or the like uses a dedicated case to carry the drone 1 as the aerial vehicle. The user can deform the guard part 23 in conformity with the size of the dedicated case, and can carry the protective member together with the drone 1. Thus, the protective member (e.g., the rotor guard) can be achieved which is easy to carry while ensuring enhanced mountability to the aerial vehicle such as the drone.

The protective member for the aerial vehicle includes mounting parts (e.g., mounting parts 21c) via which the flexible member is fastened to the support members, the mounting members each being integral with a tension adjusting member. With this feature, the number of the components of the protective member can be reduced, and the protective member can be mounted quickly and smoothly.

The mounting part is detachable from the support member. Thus, the protective member with enhanced mountability can be used repeatedly in accordance with situation.

The mounting part has a fitting hole (e.g., a fitting hole 130) into which a distal end portion of the support member is fitted. The tension adjusting member has a tension applying part (e.g., a tension applying part 120). Motion of the tension adjusting part to apply a tension to the flexible member takes place in conjunction with motion to narrow the fitting hole. Thus, the application of the tension to the flexible member and the fastening of the support member to the fitting hole can be completed by a single operation.

The tension adjusting member has a tension adjusting part (e.g., a tension adjusting part 100) which is integral with the tension applying part and an inner wall (e.g., an inner wall 110) of the fitting hole, which is deformable, and to which a fastening member is fastened. When the fastening member (e.g., an adjusting bolt 200) is tightened, the tension adjusting part moves, and the movement of the tension adjusting part causes the tension applying part to deform in a direction to apply a tension to the flexible member and the inner wall to deform, so as to narrow the fitting hole. Thus, this simple structure enables the application of a tension by the tension applying part and the fastening of the support member to the fitting hole to take place in conjunction with each other. In addition, since deformation into the state prior to the application of the tension is also possible, a detachment operation can be performed easily.

The tension applying parts (e.g., tension applying parts 120A, 120B) are provided at two locations i.e., on one side and the other side, between which the fitting hole is interposed, and are each connected to the flexible member. The tension adjusting parts (e.g., tension adjusting parts 100A, 100B) are provided at two locations, i.e., on one side and the other side, between which a gap (e.g., a gap 131) is interposed, the gap communicating with the fitting hole. When the fastening member penetrating the tension adjusting part on the one side is tightened into the tension adjusting part on the other side, the tension applying part on the one side and the tension applying part on the other side move to come close to each other. This movement of the tension applying parts results in application of a tension to each of the flexible members respectively connected to the tension applying parts located on both sides, and narrows the fitting hole. This feature makes it possible to complete the application of the tension and the tightening of the fitting hole by a single operation, and to set the tensions applied to the two flexible members in a balanced manner.

The aerial vehicle includes: a body (e.g., a body 11); and a plurality of arms (e.g., arms 12) extending from the body. An end portion of each support member adjacent to the body is connected to a distal end portion of the arm. The flexible member is stretched between the distal end portions of the support members such that the flexible member surrounds an outside of all the rotors. Even if the rotors are positioned away from the body, this feature allows the flexible member to be stretched outside the plurality of rotors without interfering with the rotors.

In the vertical direction, the flexible member is stretched at the same height as the rotors or at a position higher than the rotors. This feature can effectively prevent the rotors from contacting directly with buildings or trees. In particular, when the aerial vehicle ascends, this feature can effectively prevent damage to the rotors provided with no protective member located above the rotors.

The flexible member is elastic. This feature allows the protective member to have mountability and impact absorption at a high level. Further, elastic deformation can release an impact given at the time of collision. Therefore, constituting the flexible member by an elastic material can lower a strength intended for the flexible member from the viewpoint of impact resistance, and thus, provides a strength-related advantage.

The flexible member is made of a carbon fiber composite material. With this feature, a protective member can be achieved which is lightweight and highly strong, and has a sufficient impact resistance without impairing the flight performance of the drone.

The flexible member is slidably engaged with a plurality of engaging parts (e.g., engaging parts 421, 453) arranged in the stretching direction, and the tension adjusting member is arranged in at least, one of intervals between the engaging parts. With this feature, a single tension adjusting member can apply a tension to a large area of the flexible member over the engaging parts, thereby contributing to reduction of the total number of the tension adjusting members.

A protective member (e.g., a rotor guard 2c, 402, 502) for an aerial vehicle (e.g., a drone 1) having at least one rotor (e.g., a rotor 13) is supported on support members (e.g. support members 22c) that are connectable to the aerial vehicle, and includes: a flexible member (e.g., a guard part 23, 423, 455) that is stretched to surround an outside of the at least one rotor in planar view; a tension applying part (e.g., a tension applying part 120 of a tension adjusting member 5A) that is connected to one end portion of the flexible member in a stretching direction and pulls the flexible member supported on the support members toward the one end portion in the stretching direction so as to make the flexible member tense. This feature makes it possible to bring the flexible member into a tense state in which no flexure is allowed in the stretching direction, in which the flexible member resists displacement in a direction crossing the stretching direction. Thus, even if an obstacle comes into contact with the flexible member in a direction crossing the stretching direction, such as a direction perpendicular to the stretching direction in the vertical direction or in a horizontal plane, the flexible member remains in position and can reliably prevent damage to the rotors. Also with this feature, in a non-use state, the flexible member can be deformed into a desired shape. Thus, the protective member (e.g., the rotor guard) can be achieved which is easy to carry while ensuring enhanced mountability to the aerial vehicle.

The protective member for the aerial vehicle further includes a second tension applying part (e.g., a tension applying part 120 of a tension adjusting member 5B) that is connected to the other end portion of the flexible member in the stretching direction and pulls the flexible member supported on the support members toward the other end portion in the stretching direction. With this feature, since flexible member is pulled by the tension applying parts on both sides, a strong tension can be applied to the flexible member in a balanced manner. This contributes to further enhancement of the resistance of the flexible member to deformation.

EXPLANATION OF REFERENCE NUMERALS 1, 1b: Drone
2, 2a, 2b: Drone Guard
3, 3a, 3b: Tension Adjusting Mechanism
11: Body
112: Arm
13: Rotor
21, 621: Mounting Part
22, 22b: Support Member
23, 23a: Guard Part
221, 221a, 221b: Arm Connecting Part
222: Guard Connecting Part
223, 223a: Movable Part
F, Fa, Fb, Fc: Flight Equipment

The invention claimed is:

1. Flight equipment comprising:
an aerial vehicle having a body and at least one rotor held on the body; and
a protective member having a plurality of support members that are connected to the aerial vehicle and a plurality of flexible members stretched between distal end portions of the plurality of support members so as to surround an outside of the body, wherein
the aerial vehicle or the protective member has at least one tension adjusting mechanism that adjusts a tension applied to at least one of the plurality of flexible members in a stretching direction, by changing a distance from a center of the body to a distal end portion of at least one of the plurality of support members.

2. The flight equipment according to claim 1, wherein
at least one of the plurality of support members has: a fastenable part that is configured to be fastened to the aerial vehicle, and a movable part that has a proximal end portion overlapping with, and held on, the fastenable part, and has a distal end portion holding a corresponding one of the plurality of flexible members, and wherein an overlap length between the movable part and the fastenable part is adjustable by a corresponding one of the at least one tension adjusting mechanism.

3. The flight equipment according to claim 2, wherein
each movable part is connected to a corresponding fastenable part by a corresponding tension adjusting mechanism.

4. The flight equipment according to claim 1, wherein
at least one of the plurality of support members has: a fastenable part that is configured to be fastened to the aerial vehicle, and a movable part that has a proximal end portion pivotably connected to a distal end portion of the fastenable part and has a distal end portion holding a corresponding one of the plurality of flexible members, wherein an angle formed by the movable part and the fastenable part is adjustable by a corresponding one of the at least one tension adjusting mechanism.

5. The flight equipment according to claim 1, wherein
the at least one tension adjusting mechanism moves one of the distal end portions in a plane perpendicular to a rotation axis of a corresponding one of the at least one rotor.

6. The flight equipment according to claim 1, wherein:
at least one of the plurality of flexible members is band-shaped.

7. The flight equipment according to claim 6, wherein
a thickness direction of the at least one band-shaped flexible member is perpendicular to a rotation axis of a corresponding one of the at least one rotor.

8. The flight equipment according to claim 1, wherein at least one of the at least one tension adjusting mechanism includes at least one of a fastened side lever, a movable side lever, an adjusting screw and a lock nut.

9. A protective member mountable to an aerial vehicle having a body and at least one rotor held on the body, the protective member comprising:
a plurality of support members that are connectable to the aerial vehicle and a plurality of flexible members stretched between distal end portions of the plurality of support members so as to surround an outside of the body, wherein
at least one of the plurality of support members has: a tension adjusting mechanism that adjusts a tension applied to a flexible member in a stretching direction by changing a distance from a center of the body to a corresponding distal end portion.

10. The protective member according to claim 9, wherein each tension adjusting mechanism includes at least one of a fastened side lever, a movable side lever, an adjusting screw and a lock nut.

* * * * *